United States Patent
Singh et al.

(10) Patent No.: US 10,339,252 B2
(45) Date of Patent: Jul. 2, 2019

(54) AUTOMATED CUSTOM CIRCUIT LAYOUT ENHANCEMENT

(71) Applicant: Oracle International Corporation, Redwood Shores, CA (US)

(72) Inventors: Tanushriya Singh, Austin, TX (US); Akshay Sharma, Austin, TX (US); Duo Ding, Austin, TX (US); Chen Dan Dong, Austin, TX (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 68 days.

(21) Appl. No.: 15/693,396

(22) Filed: Aug. 31, 2017

(65) Prior Publication Data

US 2019/0065651 A1 Feb. 28, 2019

(51) Int. Cl.
*G06F 17/50* (2006.01)

(52) U.S. Cl.
CPC ...... *G06F 17/5072* (2013.01); *G06F 17/5077* (2013.01)

(58) Field of Classification Search
CPC .......................... G06F 17/5072; G06F 17/5077
USPC ........................................................ 716/122
See application file for complete search history.

(56) References Cited

U.S. PATENT DOCUMENTS

| | | | |
|---|---|---|---|
| 10,049,175 B1 * | 8/2018 | Salowe ............... | G06F 17/5072 |
| 10,083,269 B2 * | 9/2018 | De Dood ............ | G06F 17/5068 |
| 2004/0143797 A1 * | 7/2004 | Nguyen .............. | G06F 17/5045 716/122 |
| 2012/0110539 A1 * | 5/2012 | Birch .................. | G06F 17/5077 716/130 |
| 2012/0192135 A1 * | 7/2012 | Gullette ............. | G06F 17/5081 716/113 |
| 2012/0221994 A1 * | 8/2012 | Vats .................... | G06F 17/5077 716/130 |
| 2012/0241986 A1 * | 9/2012 | Sherlekar ............ | H01L 27/0207 257/784 |
| 2014/0325467 A1 * | 10/2014 | Yu ....................... | G06F 17/5077 716/130 |
| 2016/0147925 A1 * | 5/2016 | Chu .................... | G06F 17/5072 716/119 |
| 2017/0032073 A1 * | 2/2017 | Chen ................... | G06F 17/5077 |
| 2018/0285508 A1 * | 10/2018 | Pandey .............. | G06F 17/5077 |

* cited by examiner

*Primary Examiner* — Stacy Whitmore
(74) *Attorney, Agent, or Firm* — Ferguson Braswell Fraser Kubasta PC

(57) ABSTRACT

A method for enhancing a chip layout may include obtaining the chip layout including a first layer including first and second tracks, a first route occupying the first track, and an open net including open terminals. The method may further include grouping the open terminals into at least a first subset of open terminals, calculating, based on the first subset, a region of interest (ROI), determining that neither the first track nor the second track within the ROI can be used to connect all the open terminals in the first subset, determining that the first track can be used to connect all the open terminals in the first subset after moving the first route from the first track to the second track, moving, the first route from the first track to the second track, and attempting to connect all the open terminals in the first subset using the first track.

20 Claims, 18 Drawing Sheets

AUTOMATED CUSTOM CIRCUIT LAYOUT ENHANCEMENT

BACKGROUND

Automating the production of a fully routed and design rule compliant design involves a high level of computational complexity. Therefore, a given router might not be able to achieve 100% routing completion in a single run. Design rule constraints at the transistor level are quite rigorous, necessitating intelligent strategies to resolve incomplete routes. For example, design rule constraints (e.g., spacing requirements) for the contact layers between the transistor terminals and the metal 1 (M1) layer are complex and difficult to satisfy, especially as semiconductor fabrication technologies approach 10 nm and below. Applying simple strategies for resolving incomplete routes (e.g., route extensions or relocating existing routes to make room for other routes) may result in a combinatorial explosion of the search space.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method for enhancing a chip layout including obtaining the chip layout including a first layer including a first track and a second track, a first route occupying the first track, and an open net including open terminals. The method further includes grouping the open terminals into at least a first subset of open terminals, calculating, based on the first subset, a region of interest (ROI) within the chip layout, determining that neither the first track nor the second track within the ROI can be used to connect all the open terminals in the first subset, determining that the first track can be used to connect all the open terminals in the first subset after moving the first route from the first track to the second track, moving, within the chip layout, the first route from the first track to the second track, and attempting to connect all the open terminals in the first subset using the first track.

In general, in one aspect, one or more embodiments relate to a system for enhancing a chip layout including a processor, a memory including instructions that, when executed by the processor, cause the processor to obtain the chip layout including a first layer including a first track and a second track, a first route occupying the first track, and an open net including open terminals. The instructions further include grouping the open terminals into at least a first subset of open terminals, calculating, based on the first subset, a region of interest (ROI) within the chip layout, determining that neither the first track nor the second track within the ROI can be used to connect all the open terminals in the first subset, determining that the first track can be used to connect all the open terminals in the first subset after moving the first route from the first track to the second track, moving, within the chip layout, the first route from the first track to the second track, and attempting to connect all the open terminals in the first subset using the first track. The system further includes a repository including the chip layout.

In general, in one aspect, one or more embodiments of the invention relate to a non-transitory computer readable medium including instructions that, when executed by a processor, perform a method for enhancing a chip layout including obtaining the chip layout including a first layer including a first track and a second track, a first route occupying the first track, and an open net including open terminals. The method further includes grouping the open terminals into at least a first subset of open terminals, calculating, based on the first subset, a region of interest (ROI) within the chip layout, determining that neither the first track nor the second track within the ROI can be used to connect all the open terminals in the first subset, determining that the first track can be used to connect all the open terminals in the first subset after moving the first route from the first track to the second track, moving, within the chip layout, the first route from the first track to the second track, and attempting to connect all the open terminals in the first subset using the first track.

Other aspects of the invention will be apparent from the following description and the appended claims.

DETAILED DESCRIPTION

Figure 1:
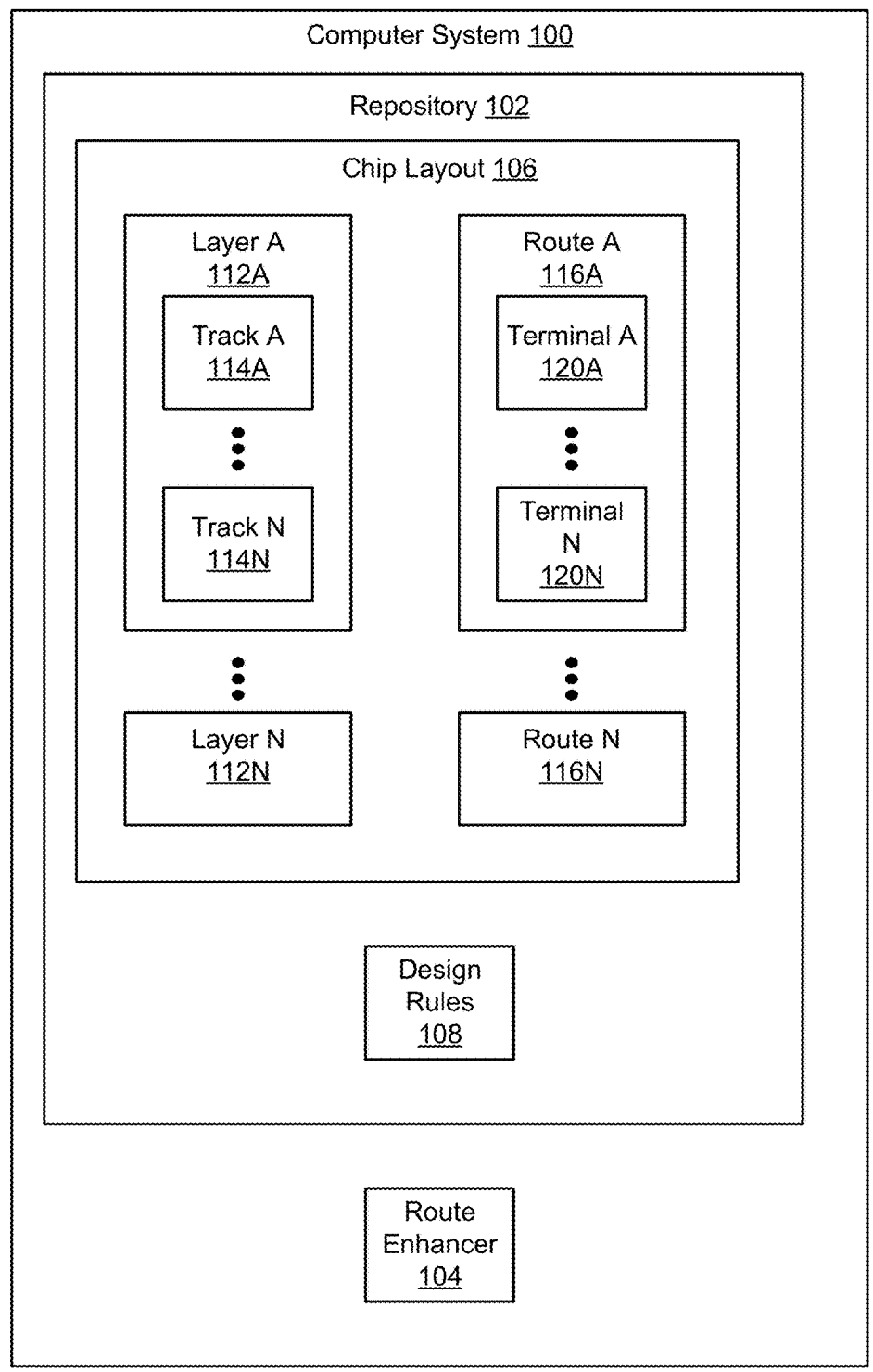
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention involve enhancing a chip layout. In one or more embodiments of the invention, the chip layout includes layers (e.g., photolithography layers) with tracks populated by routes that connect terminals (e.g., transistor terminals). In one or more embodiments, a net includes a set of terminals that that all need to be connected to each other. A net may also include the routes that connect the terminals. In a complete net, each pair of terminals in the net may be connected via a route. In contrast, an open net may include one or more open terminals that are not interconnected to each of the other terminals of the net. An incomplete chip layout may be enhanced by resolving open nets in the chip layout. An open net may be resolved by adding routes to connect each open terminal to every other terminal of the net.

In one or more embodiments, open terminals may be grouped into subsets, such that each subset has a corresponding region of interest (ROI) within which it is permissible (e.g., without violating design rule constraints applicable to the chip layout) to use a track of a next highest metal layer to connect open terminals. For example if the open terminals are on transistor-level layers, then tracks of the M1 layer will be used. And if the open terminals are on the M1 layer, then M2 tracks will be used. Subsets of open terminals may be formed in order to reduce the number of enhancements to the chip layout, where each enhancement reduces the number of open terminals.

A synergistic combination of strategies may be applied to enhance the chip layout in an efficient manner. The strategies may be applied to connect the open terminals in a subset with a specific layer (e.g., the lowest metal layer). In one or more embodiments, these strategies include: rip-up and reroute with lookahead (including relocating one or more routes blocking the tracks within the ROI), expanding the ROI to include more tracks by relocating various layers (e.g., diffusion layers, "cut" layers, etc.), and shifting additional tracks into the ROI. In one or more embodiments, a route enhancer looks several moves ahead and applies a combination of incremental changes to the chip layout to resolve an open net. For example, it might not be possible to resolve open terminals of a first net directly, but relocating a second net might enable the resolution of the open terminals of the first net.

In one or more embodiments, an initial stage focuses on open terminals unconnected to the lowest metal layer (e.g., the M1 layer) relative to the technology (e.g., 10 nm technology) used in the chip layout. In one or more embodiments, after the open terminals are connected to the lowest metal layer, any remaining open terminals may then be connected using successively higher layers (e.g., M2, then M3, etc.) of the metal layer hierarchy for the technology used in the chip layout. However, simple strategies may be sufficient to connect open terminals to higher layers (e.g., above the lowest layer) of the metal layer hierarchy, due to less restrictive design rule constraints.

FIG. 1 shows a system in accordance with one or more embodiments of the invention. As shown in FIG. 1, the system includes a computer system (100) that includes a repository (102) and a route enhancer (104). In one or more embodiments, the computer system (100) takes the form of the computing system (600) described with respect to FIG. 6A and the accompanying description below, or takes the form of the client device (626) described with respect to FIG. 6B.

In one or more embodiments, the repository (102) may be any type of storage unit and/or device (e.g., a file system, database, collection of tables, or any other storage mechanism) for storing data. Further, the repository (102) may include multiple different storage units and/or devices. The multiple different storage units and/or devices may or may not be of the same type or located at the same physical site.

In one or more embodiments, the repository (102) includes a chip layout (106) and design rules (108). The chip layout (106) may include layers (112A, 112N) and routes (116A, 116N). Examples of layers (112A, 112N) may include metal layers (e.g., M1, M2, etc.), diffusion layers, contact layers, various photolithography layers, etc. The number and types of layers (112A, 112N) may be based on the fabrication technology used in the chip layout (106). In one or more embodiments, the lowest metal layer (112A) of the chip layout (106) used for routing relative to a given technology (e.g., a 10 nm technology) may be referred to as the metal 1 (M1) layer. Each metal layer may include tracks (114A, 114N). A track may be populated by routes (116A, 116N) of the corresponding metal layer. In one or more embodiments, the tracks (114A, 114N) of a layer define the positions that the corresponding routes (116A, 116N) may populate on the chip layout (106). In one or more embodiments, the tracks (114A, 114N) of a layer are generated relative to the design rule constraints (e.g., spacing constraints) applicable to the layer.

In one or more embodiments, each route (116A, 116N) may connect terminals (120A, 120N) via metal shapes and corresponding metal contacts. In one or more embodiments, a terminal (120A, 120N) is any component of the chip layout (106) that may be connected to other terminals via a route. For example, a terminal may be a pin of a circuit element. Examples of circuit elements may include transistors, amplifiers, inverters, diodes, resistors, capacitors, inductors, etc. For example, a transistor may include base, collector, and emitter terminals (120A, 120N). A contact may be used to connect a terminal to a next highest metal layer (e.g., where these connections eventually form routes (116A, 116N) that connect a terminal to another terminal). In one or more embodiments, the layer used to connect a specific terminal is determined by the hierarchy of layers (112A, 112N) of a specific technology.

In one or more embodiments, a terminal may be a segment of a route. For example, a segment of a route at the M1 layer (112A) may be a terminal when the segment may be connected to another terminal on the M1 layer (112A) using the M2 layer.

In one or more embodiments, a net includes a set of terminals (120A, 120N) that all need to be connected to each other (e.g., the terminals (120A, 120N) in the set all have the same electrical connectivity). In one or more embodiments, a net also includes the routes (116A, 116N) that connect the terminals (120A, 120N) of the net. In a complete net, each pair of terminals (120A, 120N) of the net may be connected via a route. In contrast, an open net may include one or more open terminals (120A, 120N) that are not interconnected to each of the other terminals (120A, 120N) of the net. An open net may be resolved by adding routes (116A, 116N) to connect each open terminal to every other terminal of the net. In one or more embodiments, a complete chip layout (106) includes complete nets without any open nets.

In one or more embodiments, a terminal in a first metal layer may be connected to a second metal layer. For example, the second metal layer may be the next highest metal layer above the first metal layer in the hierarchy of metal layers (112A, 112N) for the technology used in the chip layout (106).

Continuing with FIG. 1, the design rules (108) may include various rules and/or constraints on the chip layout (106) relative to a technology. In one or more embodiments, the design rules (108) may include the following: spacing constraints between layers (112A, 112N), fanout constraints that determine load-driving capacities of circuit elements, transition time constraints for a circuit element to change its logic value, capacitance constraints, delay constraints, etc.

In one or more embodiments, the route enhancer (104) is implemented in hardware (e.g., circuitry), software, or any combination thereof. In one or more embodiments, the route enhancer (104) includes functionality to modify a chip layout (106) while satisfying the design rules (108). For example, modifications performed by the route enhancer (104) on the chip layout (106) may result in adding or replacing routes (116A, 116N).

While FIG. 1 shows a configuration of components, other configurations may be used without departing from the scope of the invention. For example, various components may be combined to create a single component. As another example, the functionality performed by a single component may be performed by two or more components.

Figure 2:
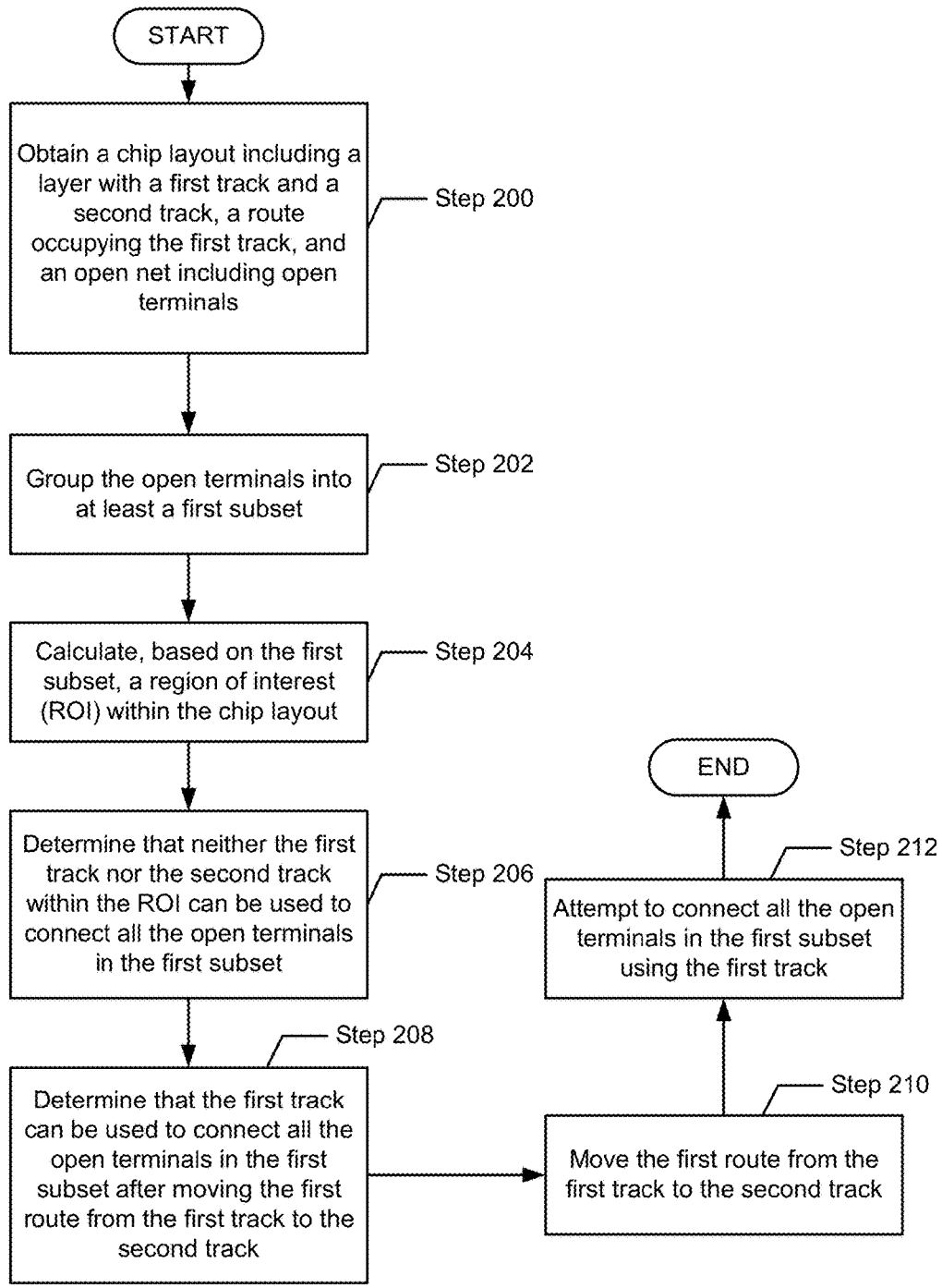
FIG. 2, FIG. 3A, FIG. 3B, FIG. 3C, and FIG. 3D show flowcharts in accordance with one or more embodiments of the invention.

FIG. 2 shows a flowchart in accordance with one or more embodiments of the invention. The flowchart depicts a process for enhancing a chip layout. One or more of the steps in FIG. 2 may be performed by the components (e.g., the route enhancer (104) of the computer system (100), discussed above in reference to FIG. 1). In one or more embodiments of the invention, one or more of the steps shown in FIG. 2 may be omitted, repeated, and/or performed in parallel, or in a different order than the order shown in FIG. 2. Accordingly, the scope of the invention should not be considered limited to the specific arrangement of steps shown in FIG. 2.

Initially, in Step 200, a chip layout that includes a layer with a first track and a second track is obtained. The chip layout may be obtained from a repository. In one or more embodiments, the chip layout may be the output of an automated chip layout program. In one or more embodiments, a track of a layer defines positions that routes on that layer may populate. In one or more embodiments, the chip layout includes a first route occupying the first track and an open net including open terminals. Each route may connect a set of terminals. In one or more embodiments, a terminal may be a pin of a circuit element. In one or more embodiments, a terminal may be a segment of a route. In one or more embodiments, an open net includes open terminals that are not interconnected to each of the other terminals of the net. That is, an open terminal is not interconnected to every other terminal of the same net. In one or more embodiments, the layer is the M1 layer. In one or more embodiments, a goal of the process for enhancing the chip layout is to connect the open terminals to the next highest metal layer. For example, these connections may form routes connecting open terminals to other terminals of the same net. For example, although the routes may not be able to completely connect the open terminals to other terminals of the same net, such partial routes may be completed during subsequent phases of route enhancement using higher metal layers.

In Step 202, the open terminals are grouped into at least a first subset. In one or more embodiments, each subset of open terminals has at least one common solution (e.g., a common set of modifications to the chip layout) that connects each open terminal of the subset using a track of the metal layer, while satisfying the applicable design rule constraints.

In Step 204, a region of interest (ROI) within the chip layout is calculated based on the first subset. In one or more embodiments, the ROI indicates where tracks of the next highest metal layer may be used to connect the open terminals without violating the design rule constraints (e.g., minimum spacing constraints between layers of the chip layout) for the technology used in the chip layout. In one or more embodiments, the ROI is included within a search window that maximizes the overlap of open terminals in the first subset within a specific range of y-coordinates of the chip layout. Alternatively, in one or more embodiments, the ROI is included within a search window that maximizes the overlap of open terminals in the first subset within a specific range of x-coordinates of the chip layout. In one or more embodiments, there are multiple ROIs included within the search window. Therefore, multiple ROIs may be calculated for the first subset, in which case Step 206, Step 208, Step 210, and Step 212 below may be performed for each ROI until all the open terminals in the subset are connected.

In Step 206, it is determined that neither the first track nor the second track within the ROI can be used to connect all the open terminals in the first subset. In one or more embodiments, various tracks within the ROI may already be populated with routes such that the track lacks sufficient resources (e.g., space) for connecting all the open terminals in the first subset. In Step 208, it is determined that the first track within the ROI can be used to connect all the open terminals in the first subset after moving the first route from the first track to the second track. In one or more embodiments, moving the first route from the first track to the second track frees up sufficient resources of the first track to connect all the open terminals in the first subset, without violating the design rule constraints.

In Step 210, the first route is moved from the first track to the second track. In one or more embodiments, moving the first route from the first track to the second track includes relocating the corresponding metal shapes and metal contacts from the first track to the second track.

In Step 212, an attempt is made to connect all the open terminals in the first subset using the first track. That is, it may be possible to connect the open terminals in the first subset using the first track now that the first route has been relocated.

Step 208, Step 210, and Step 212 above may be collectively referred to as a rip-up and reroute with lookahead strategy because the first route is "ripped up" from the first track and "rerouted" to the second track. The lookahead aspect relates to observing that the first route already occupies the first track, and therefore must be relocated in order to allow the open terminals in the first subset to be connected using contacts within the first track. The rip-up and reroute with lookahead strategy is described further in FIG. 3B below.

Figure 3A:
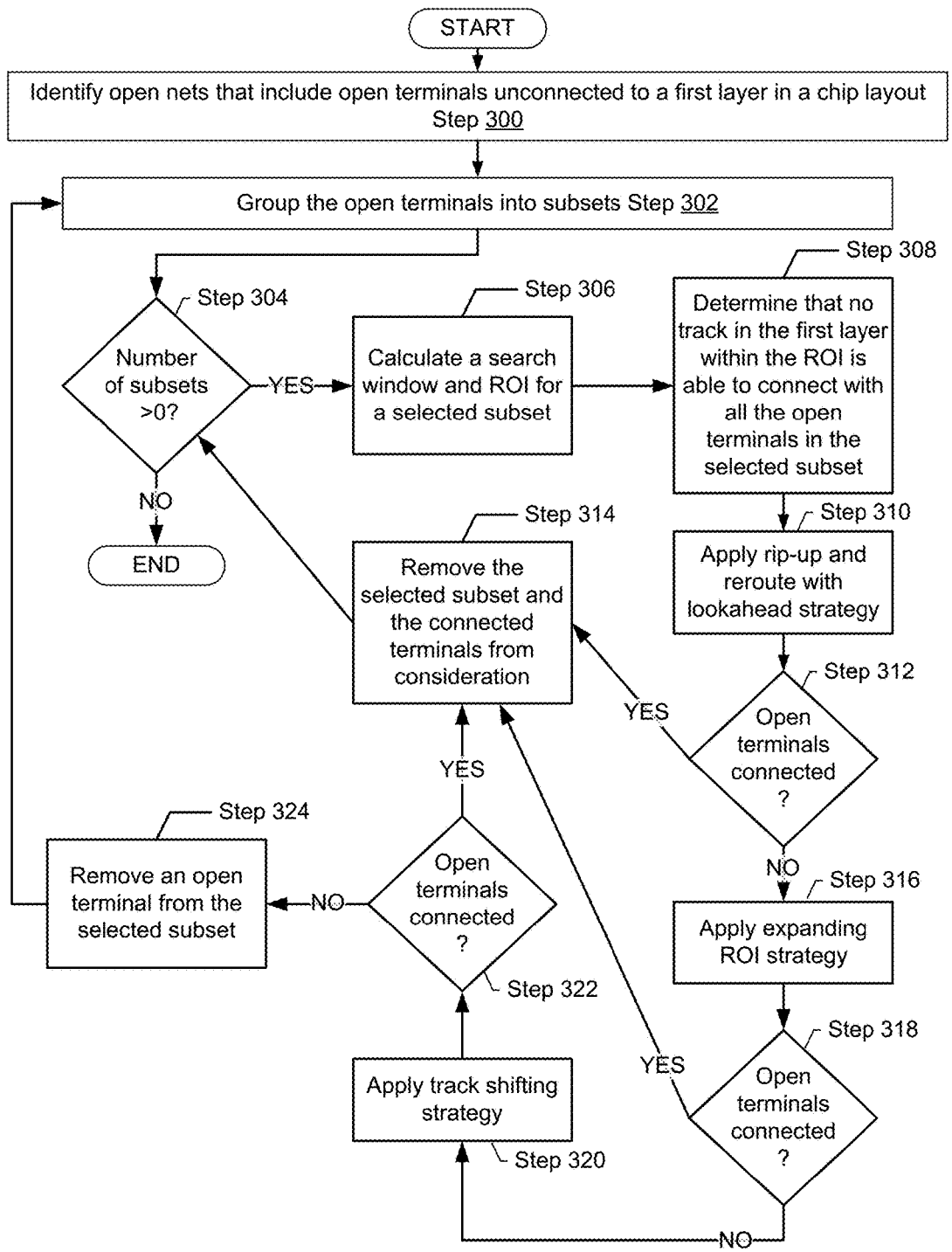

FIG. 3A shows a flowchart in accordance with one or more embodiments of the invention. The flowchart depicts a process for enhancing a chip layout. One or more of the steps in FIG. 3A may be performed by the components (e.g., the route enhancer (104) of the computer system (100), discussed above in reference to FIG. 1). In one or more embodiments of the invention, one or more of the steps shown in FIG. 3A may be omitted, repeated, and/or performed in parallel, or in a different order than the order shown in FIG. 3A. Accordingly, the scope of the invention should not be considered limited to the specific arrangement of steps shown in FIG. 3A.

Initially, in Step 300, open nets that include open terminals that are unconnected to a first layer in a chip layout are identified (see description of Step 200 above).

In Step 302, the open terminals are grouped into subsets (see description of Step 202 above). In one or more embodiments, each subset includes as many open terminals as possible that may be connected with a common solution (e.g., a common set of modifications to the chip layout). The common solution may be thought of as a "move" in a game.

For example, when a large subset of open terminals has a common solution, the search through the space of possible modifications to the chip layout (i.e., the space of possible "moves") may be simplified, resulting in efficient (i.e., with low computational overhead) enhancement of the chip layout.

If, in Step 304, the number of subsets is greater than zero, then in Step 306 a search window and ROI are calculated for a selected subset (see description of Step 204 above). In one or more embodiments, if the number of subsets is zero, then there are no remaining open terminals requiring connection to the first layer, and this phase of the route enhancement process is complete. For example, if all of the open nets are not resolved during this phase, subsequent processing may be required to resolve additional open terminals using higher metal layers via a similar strategy.

In Step 308, it is determined that no track in the first layer within the ROI can be used to connect all the open terminals in the selected subset (see description of Step 206 above).

In Step 310, a rip-up and reroute with lookahead strategy is applied in an attempt to connect all the open terminals in the selected subset to the first layer (see description of FIG. 3B below).

If, in Step 312, it is determined that the rip-up and reroute with lookahead strategy (of Step 310) succeeded in connecting all the open terminals in the selected subset to the first layer, then Step 314 below is performed. Otherwise, if Step 312 determines that the rip-up and reroute with lookahead strategy failed, then Step 316 below is performed.

In Step 314, the selected subset and the connected terminals are removed from consideration. That is, once all the open terminals in the selected subset have been connected, processing of the selected subset is now complete. Execution then continues with Step 304 above, to process additional subsets of open terminals.

In Step 316, an expanding ROI strategy is applied in an attempt to connect all the open terminals in the selected subset to the first layer (see description of FIG. 3C below).

If, in Step 318, it is determined that the expanding ROI strategy (of Step 316) succeeded in connecting all the open terminals in the selected subset to the first layer, then Step 314 above is performed. Otherwise, if Step 318 determined that the expanding ROI strategy failed, then Step 320 below is performed.

In Step 320, a track shifting strategy is applied in an attempt to connect all the open terminals in the selected subset to the first layer (see description of FIG. 3D below).

If, in Step 322, it is determined that the track shifting strategy (of Step 320) succeeded in connecting all the open terminals in the selected subset to the first layer, then Step 314 above is performed. Otherwise, if Step 322 determined that the track shifting strategy failed, then Step 324 below is performed.

In Step 324, an open terminal is removed from the selected subset. In one or more embodiments, the removed open terminal is an open terminal that most limits finding a common solution that connects all the open terminals of the selected subset to the first layer. For example, removing a specific open terminal from the selected subset may permit the largest number of common solutions that connect all of the remaining open terminals of the selected subset to the first layer. Execution then continues with Step 302 above, to regroup the open terminals into subsets. In one or more embodiments, if the selected subset includes only a single open terminal, then the single open terminal may be subsequently processed as a subset that includes the single open terminal, to be selected for processing in a subsequent iteration of Step 306 above.

In one or more embodiments, the strategies described above may be applied to the chip layout in various combinations and/or sequences (e.g., depending on specific decision branches taken in FIG. 3A during the processing of different subsets of open terminals). In one or more embodiments, Step 310 (rip-up and reroute with lookahead) is performed before Step 316 (expanding the ROI), which is performed before Step 320 (track shifting) in order to connect all the terminals of the selected subset to the first layer. For example, performing rip-up and reroute with lookahead (Step 310) may connect a portion of the open terminals of the selected subset to the first layer, and then expanding the ROI (Step 316) and track shifting (Step 320) may connect the remaining open terminals of the selected subset to the first layer.

In one or more embodiments, successively smaller subsets of open terminals are selected in successive iterations of the loop from Step 302 to Step 324. For example, if common solutions are not found for larger subsets, then smaller subsets (e.g., subsets containing a single open terminal) may be examined in subsequent iterations of the loop from Step 302 to Step 324 (e.g., when open terminals are removed from subsets in Step 324).

In one or more embodiments, once all the open terminals requiring a connection to the first layer (e.g., the M1 layer) are connected to the first layer, then a subsequent route enhancement phase may be performed that forms connections to other (e.g., higher) layers of the chip layout. During the subsequent route enhancement phase, the applicable design rule constraints may not be as complex and difficult to satisfy relative to the applicable design rule constraints for connecting open terminals to the first (e.g., M1) layer. Therefore, simpler techniques (e.g., simple rip-up and reroute without lookahead) than the aforementioned route enhancement techniques may be sufficient to perform the subsequent route enhancement phase.

Figure 3B:
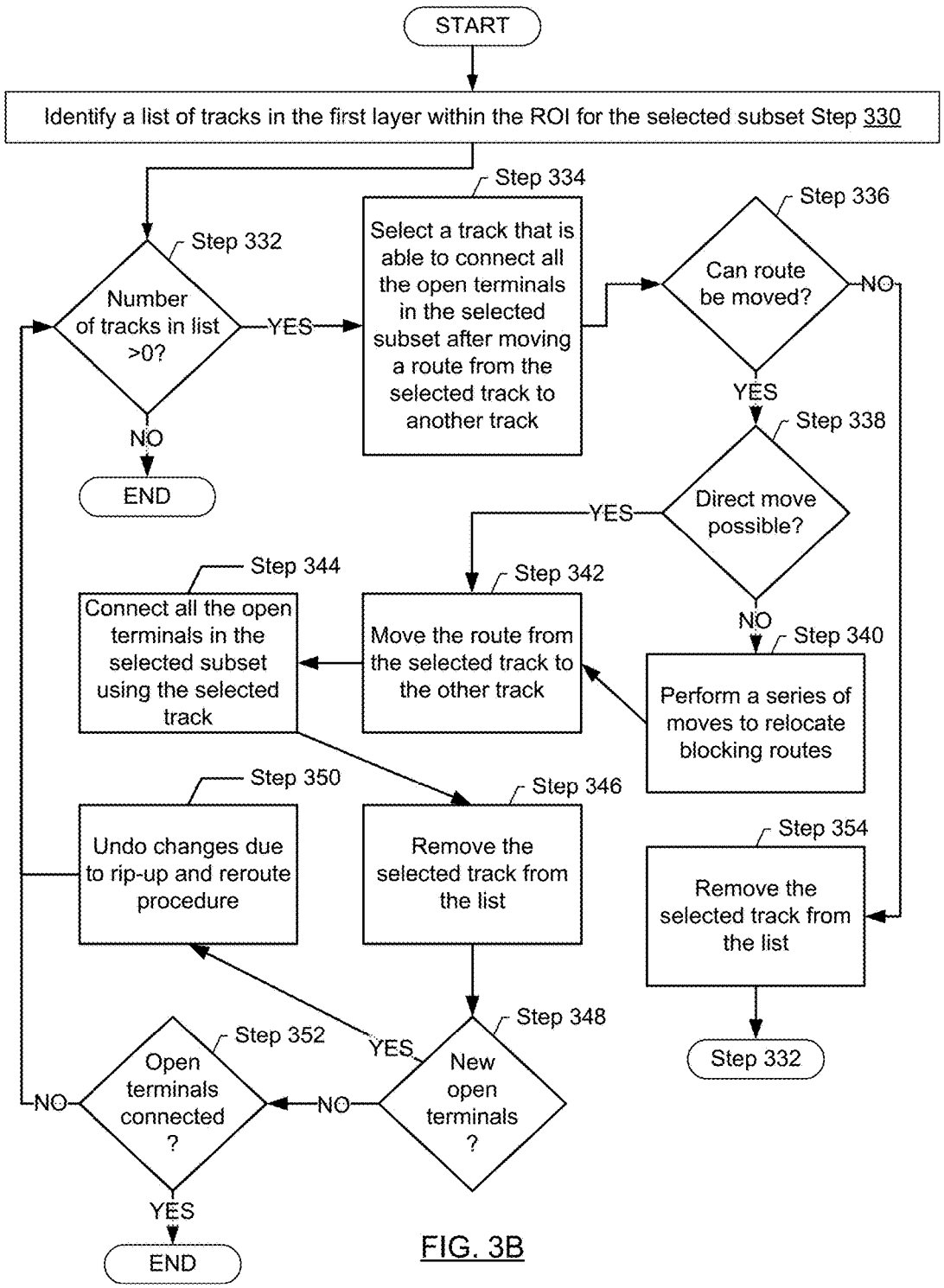

FIG. 3B shows a flowchart in accordance with one or more embodiments of the invention. The flowchart depicts a process for enhancing a chip layout. Moreover, the flowchart in FIG. 3B may correspond to Step 310 in FIG. 3A. One or more of the steps in FIG. 3B may be performed by the components (e.g., the route enhancer (104) of the computer system (100), discussed above in reference to FIG. 1). In one or more embodiments of the invention, one or more of the steps shown in FIG. 3B may be omitted, repeated, and/or performed in parallel, or in a different order than the order shown in FIG. 3B. Accordingly, the scope of the invention should not be considered limited to the specific arrangement of steps shown in FIG. 3B.

Initially, in Step 330, a list of tracks in the first layer within the ROI for the selected subset is identified. In one or more embodiments, each track in the list represents a possible position to connect open terminals in the subset of open terminals selected (e.g., in Step 306) above in FIG. 3A.

If, in Step 332, the number of tracks in the list is greater than zero, then in Step 334 a track is selected from the list that can be used to connect all the open terminals in the selected subset after moving a route from the selected track to another track within the chip layout (see description of Step 208 above). Otherwise, if the number of tracks in the list is zero, then there are no remaining tracks in the first layer within the ROI to consider, and the rip-up and reroute with lookahead strategy exits with failure.

If, in Step 336, it is determined that the route can be moved to another track, then Step 338 below is performed. Otherwise, if Step 336 determines that the route cannot be moved to another track, then in Step 354, the selected track is removed from the list, and execution continues with Step 332 above, to process other candidate tracks.

If, in Step 338, it is determined that the route can be directly moved to another track, then Step 342 below is performed. In one or more embodiments, the route can be directly moved to another track when the other track has sufficient available resources to accommodate the route (e.g., there are no other routes blocking the use of the other track).

Otherwise, if Step 338 determines that the route cannot be directly moved to another track, then in Step 340, a sequence of moves to relocate the blocking routes is performed. In one or more embodiments, a lookahead capability determines the sequence of moves to free up the other track. For example, a blocking route may be moved to an available track T with sufficient resources to accommodate the blocking route. If there are no such available tracks, then a track may be made available by relocating one or more routes occupying that track, and so on, as a sequence of moves may be used to relocate a sequence of routes blocking a series of tracks, in order to achieve the objective of freeing up the availability of the selected track.

In Step 342, the route is moved from the selected track to the other track (see description of Step 210 above).

In Step 344, all the open terminals in the selected subset are connected using the selected track (see description of Step 212 above).

In Step 346, the selected track is removed from the list. That is, the selected track has now been processed, and therefore is no longer a candidate for future processing.

If, in Step 348, it is determined that new open terminals have been introduced as a result of moving routes from the selected track to the other track in Step 340 and/or Step 342 above, then in Step 350 the changes to the chip layout due to the rip-up and reroute procedure performed in Step 340, Step 342, and/or Step 344 above are reverted (e.g., undone). Execution then continues with Step 332 above, to process other candidate tracks.

In one or more embodiments, reverting changes to the chip layout that introduce new open terminals avoids a potentially diverging search space, where each solution generates new open terminals. Alternatively, in one or more embodiments, changes to the chip layout that introduce new open terminals are permitted (i.e., without reverting) when the number of new open terminals introduced is below a threshold. For example, new open terminals may be permitted when the number of new open terminals introduced (e.g., in Step 342 above) is less than the number of open terminals connected using the selected track (e.g., in Step 344 above).

Otherwise, if Step 348 determines that no new open terminals have been introduced, then Step 352 below is performed.

If, in Step 352, it is determined that all the open terminals in the selected subset may be connected to the first layer, then all the open terminals in the selected subset are connected to the first layer, and the rip-up and reroute with lookahead strategy exits with success.

Otherwise, if Step 352 determines that not all the open terminals in the selected subset may be connected to the first layer, execution continues with Step 332 above, to process other candidate tracks. In one or more embodiments, a portion of the open terminals in the first subset may be connected to the first layer prior to executing Step 332, and the now-connected (i.e., formerly open) terminals may be removed from the first subset. That is, although the goal of connecting all the open terminals in the first subset to the first layer was not achieved, connecting a portion of the open terminals in the first subset to the first layer may achieve progress toward the enhancement and eventual completion of the chip layout.

Figure 3C:
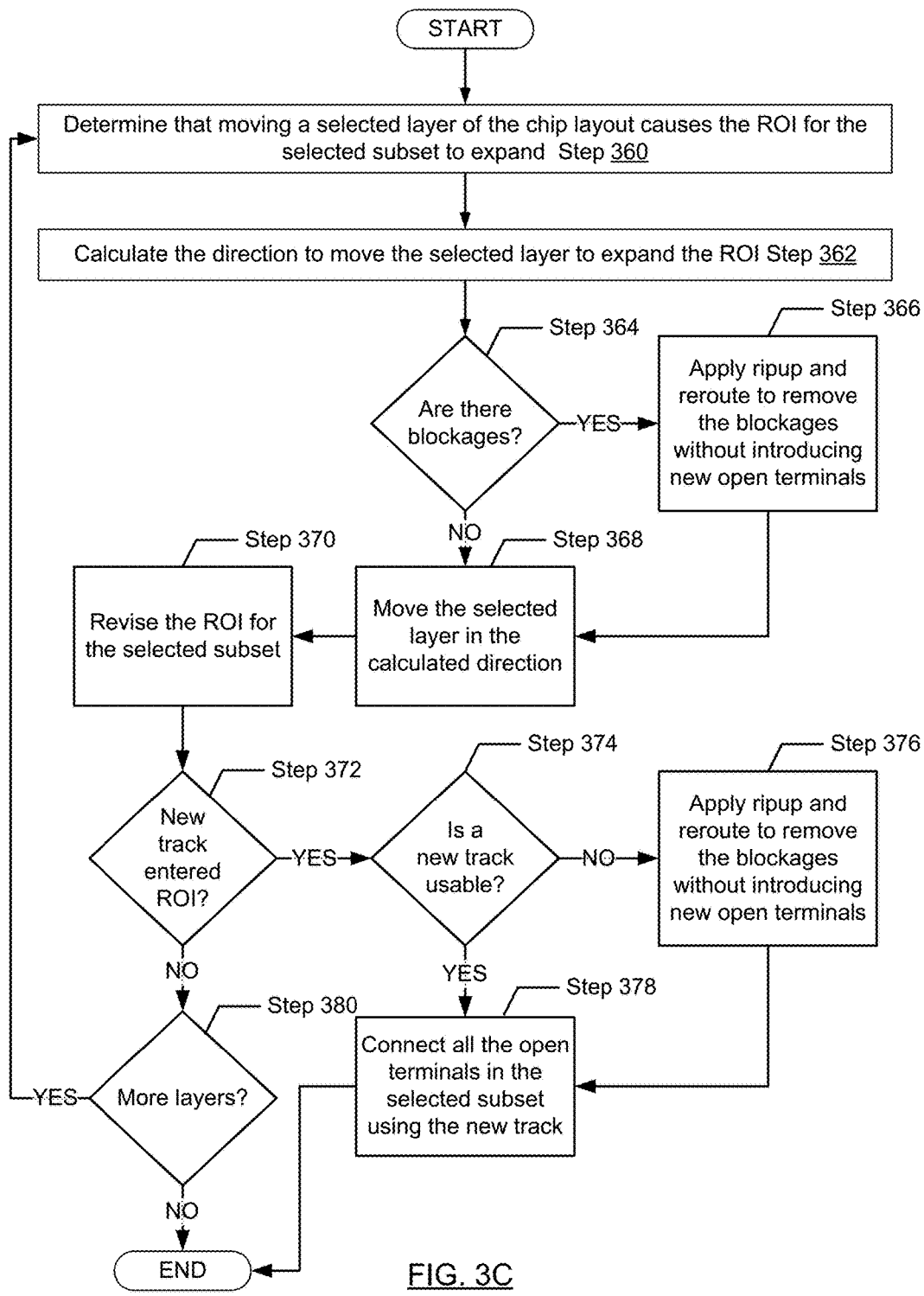

FIG. 3C shows a flowchart in accordance with one or more embodiments of the invention. The flowchart depicts a process for enhancing a chip layout. Moreover, the flowchart in FIG. 3C may correspond to Step 316 in FIG. 3A. One or more of the steps in FIG. 3C may be performed by the components (e.g., the route enhancer (104) of the computer system (100), discussed above in reference to FIG. 1). In one or more embodiments of the invention, one or more of the steps shown in FIG. 3C may be omitted, repeated, and/or performed in parallel, or in a different order than the order shown in FIG. 3C. Accordingly, the scope of the invention should not be considered limited to the specific arrangement of steps shown in FIG. 3C.

Initially, in Step 360, it is determined that moving a selected layer of the chip layout causes the ROI for the subset of open terminals selected above in FIG. 3A (e.g., in Step 306) to expand. For example, the selected layer may be blocking connectivity, and therefore its relocation may expand the ROI within which it may be permitted to connect open terminals, while satisfying the applicable design rule constraints. Examples of the selected layer may include: a cut layer, a diffusion layer, one or more diffusion rows of circuit elements (e.g., transistors), etc. Alternatively, it may be determined that the ROI cannot be expanded without violating the applicable design rule constraints, in which case the expanding ROI strategy exits with failure.

In Step 362, the direction in which to move the selected layer to expand the ROI is calculated. For example, the selected layer may be moved to a new location that is above its current location within the chip layout. Alternatively, the selected layer may be moved to a new location that is below its current location within the chip layout. In one or more embodiments, the new location may be chosen with the goal of expanding the ROI so that at least one new track enters the expanded ROI for further exploration, while satisfying the applicable design rule constraints.

If, in Step 364, it is determined that the new location for the selected layer is blocked, then in Step 366, the rip-up and reroute with lookahead strategy is applied in an attempt to move any blockages without introducing new open terminals (see previous description of FIG. 3B). For example, the rip-up and reroute with lookahead strategy may be applied to move a route that is blocking the new location.

In Step 368, the selected layer is moved in the direction calculated above in Step 362. For example, the selected layer may be moved to the new location.

In Step 370, the ROI is revised for the selected subset (see previous description of step 204 of FIG. 2). In one or more embodiments, the revised ROI is expanded as a result of relocating the selected layer to the new location.

If, in Step 372, it is determined that one or more new tracks in the first layer have entered the expanded ROI, then Step 374 below is executed. Otherwise, if it is determined that no new tracks have entered the expanded ROI, then Step 380 below is performed.

If, in Step 374, it is determined that a new track identified in Step 372 above is usable (e.g., the new track is available to connect all the open terminals selected above in FIG. 3A), then Step 378 below is executed. Otherwise, if it is determined that no new track identified in Step 372 above is directly usable, then Step 376 below is performed.

In Step 376, the rip-up and reroute with lookahead strategy is applied to remove the blockages in a new track identified in Step 372 above. In one or more embodiments, the rip-up and reroute with lookahead strategy is applied to each new track identified in Step 372 above in turn, until the rip-up and reroute with lookahead strategy succeeds for a new track identified in Step 372 above (e.g., without introducing new open terminals, as described previously in FIG. 3B). In one or more embodiments, a blockage may be a route occupying the new track.

In Step 378, all the open terminals of the selected subset are connected to the new track. The expanding ROI strategy then exits with success.

If, in Step 380, it is determined that there are additional candidate layers to consider moving, then execution continues with Step 360 above in an attempt to continue expanding the ROI based on the selection of another candidate layer. Otherwise, if there are no more additional candidate layers to consider, then the expanding ROI strategy exits with failure.

Figure 3D:
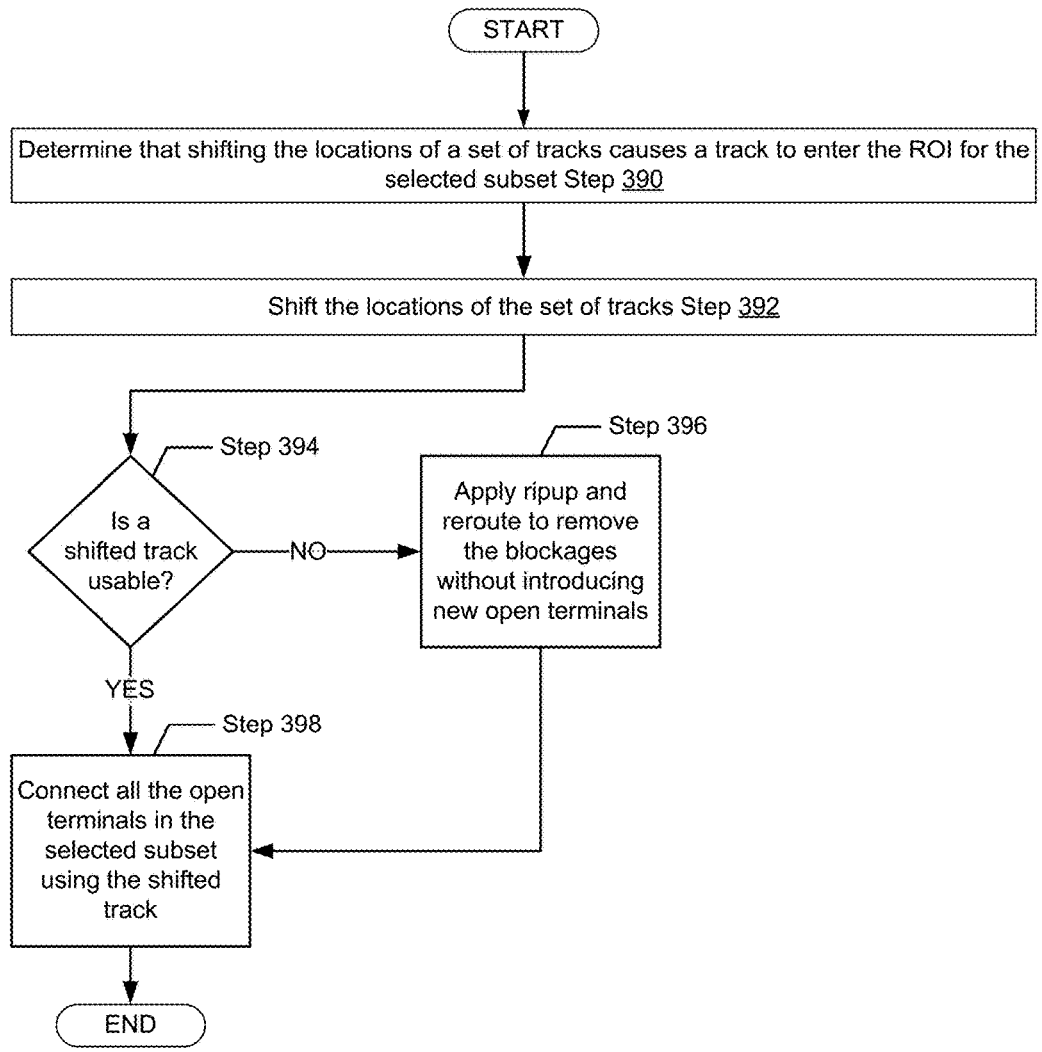

FIG. 3D shows a flowchart in accordance with one or more embodiments of the invention. The flowchart depicts a process for enhancing a chip layout. Moreover, the flowchart in FIG. 3D may correspond to Step 320 in FIG. 3A. One or more of the steps in FIG. 3D may be performed by the components (e.g., the route enhancer (104) of the computer system (100), discussed above in reference to FIG. 1). In one or more embodiments of the invention, one or more of the steps shown in FIG. 3D may be omitted, repeated, and/or performed in parallel, or in a different order than the order shown in FIG. 3D. Accordingly, the scope of the invention should not be considered limited to the specific arrangement of steps shown in FIG. 3D.

Initially, in Step 390, it is determined that shifting the locations of a set of tracks causes a new track to enter the ROI for the subset of open terminals selected above in FIG. 3A (e.g., in Step 306). In other words, shifting the locations of one or more tracks may cause a new track to arrive at a new location that is within the ROI for the selected subset. For example, the applicable design rule constraints may indicate that in order to shift the location of a new track into the ROI, a series of other tracks must also be shifted locally within the chip layout. For example, the set of tracks may be shifted to new locations that are above their current locations within the chip layout. Alternatively, the set of tracks may be shifted to new locations that are below their current locations within the chip layout. In one or more embodiments, shifting a track implies moving the routes populating the track. Therefore, before moving the set of tracks, it may be desirable to check for violations of design rule constraints, and to check whether new open terminals might be introduced in the chip layout. In one or more embodiments, the new locations may be chosen with the goal of reducing the distance between the new locations and the current locations of the set of tracks.

If Step 390 determines that a track cannot be shifted into the ROI without violating the applicable design rule constraints, then the track shifting strategy exits with failure.

In Step 392, the locations of the set of tracks identified in Step 390 above are shifted.

If, in Step 394, it is determined that a track shifted in Step 392 above has entered the ROI and is usable (e.g., the shifted track is available to connect all the open terminals selected above in FIG. 3A), then Step 398 below is executed. Otherwise, if it is determined that no track shifted into the ROI in Step 392 above is directly usable, then Step 396 below is performed.

In Step 396, the rip-up and reroute with lookahead strategy is applied to remove the blockages in a shifted track that has entered the ROI as a result of performing Step 392 above. In one or more embodiments, the rip-up and reroute with lookahead strategy is applied to each blocked shifted track that has entered the ROI in turn, until the rip-up and reroute with lookahead strategy succeeds (e.g., without introducing new open terminals, as described previously in FIG. 3B). In one or more embodiments, a blockage may be a route occupying the shifted track. If the rip-up and reroute with lookahead strategy does not succeed for any of the blocked shifted tracks that have entered the ROI, then the track shifting strategy exits with failure.

In Step 398, all the open terminals of the selected subset are connected to the usable shifted track. The track shifting strategy then exits with success.

In one or more embodiments, the track shifting strategy is applied after the failure of the expanding ROI strategy (see description of FIG. 3C above). However, in such a scenario, despite the failure of the expanding ROI strategy to connect all the open terminals of the selected subset, the expanding ROI strategy may enable the success of the track shifting strategy by expanding the ROI. For example, a usable track may be shifted into an expanded ROI, but the usable track may not have been shifted into the original (e.g., unexpanded) ROI. Therefore, applying the expanding ROI strategy of FIG. 3C prior to applying the track shifting strategy of FIG. 3D may enable the track shifting strategy to succeed in scenarios where otherwise the track shifting strategy would have failed.

Figure 4A:
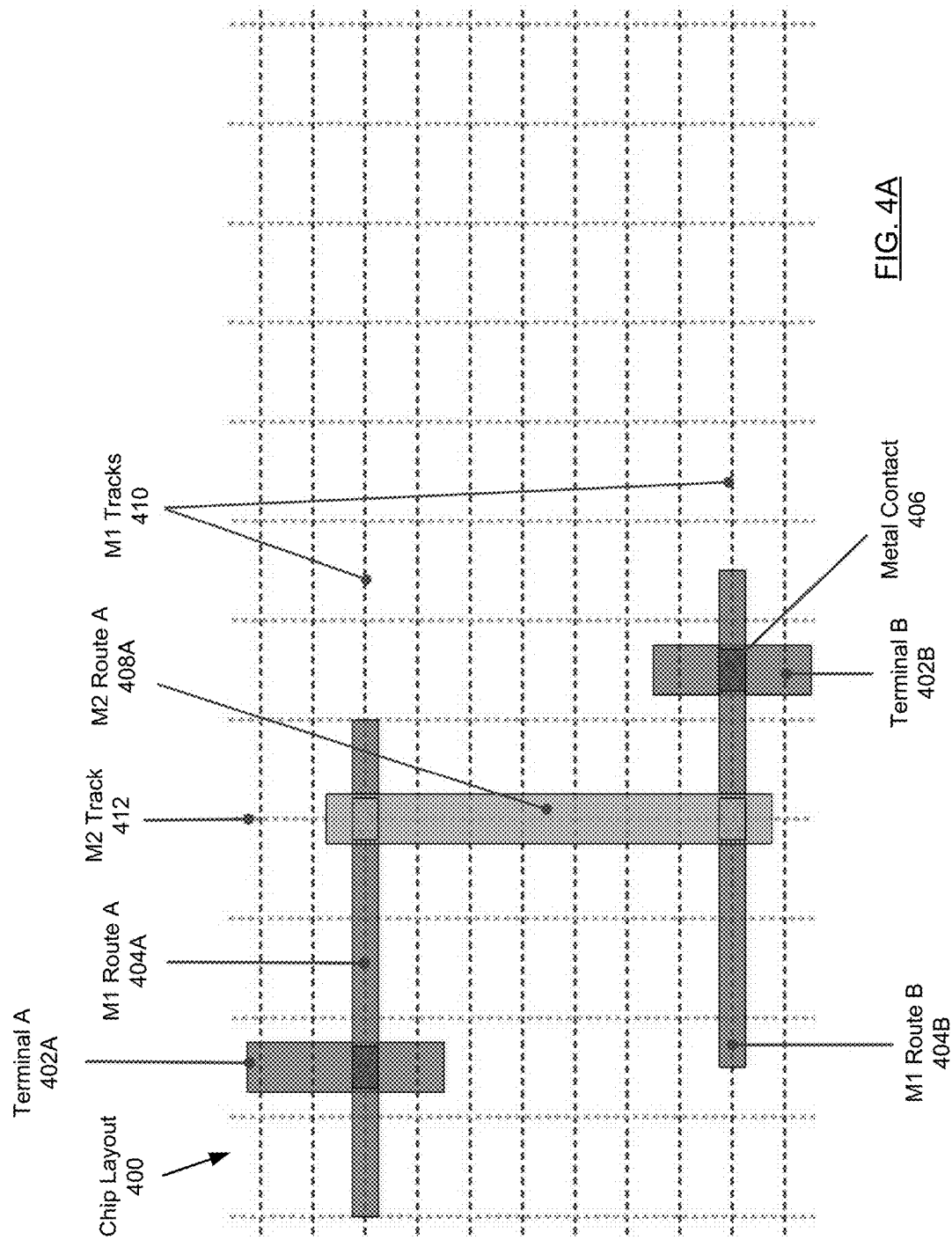
FIG. 4A and FIG. 4B show examples in accordance with one or more embodiments of the invention.
Figure 4B:
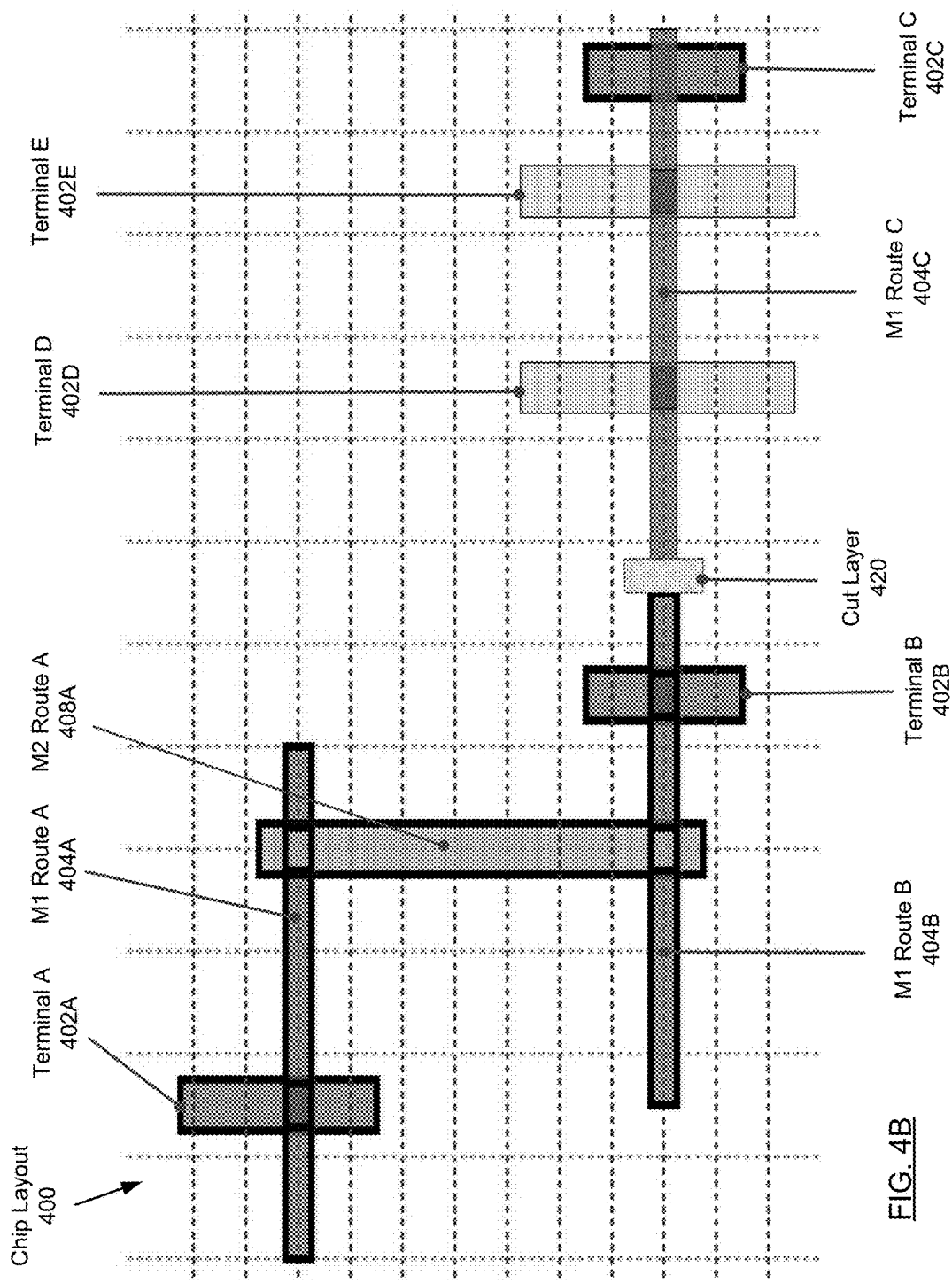

The following example is for explanatory purposes only and not intended to limit the scope of the invention. FIG. 4A and FIG. 4B show an implementation example in accordance with one or more embodiments of the invention.

FIG. 4A illustrates a chip layout (400) including transistor-level terminals (e.g., 402A, 402B) belonging to the same net (net1). FIG. 4A also shows M1 routes (404A, 404B) and an M2 route (408A) that connect the various terminals (e.g., 402A, 402B) to net1. The M1 routes (404A, 404B) occupy (horizontal) tracks (e.g., 410) of the M1 layer, and the M2 route A (408A) occupies a (vertical) track (e.g., 412) of the M2 layer. In addition, FIG. 4A shows metal contacts (e.g., 406), which are part of the various routes (404A, 404B, 408A).

In FIG. 4B, terminal A (402A), terminal B (402B), and terminal C (402C) all belong to net1. Net1 also includes M1 route A (404A), M1 route B (404B) and M2 route A (408A). Similarly, terminal D (402D) and terminal E (402E) belong to the same net (net2), and are connected via M1 route C (404C). Terminal C (402C) is an open terminal of net1, since terminal C (402C) is not connected to the other terminals of net1. FIG. 4B also shows that a cut layer (420) divides M1 route B (404B) and M1 route C (404C). A cut layer may be used to segment the net connectivity (e.g., segment the nets) of another layer.

The following example is for explanatory purposes only and not intended to limit the scope of the invention. FIG. 5A, FIG. 5B, FIG. 5C, FIG. 5D, FIG. 5E, FIG. 5F, FIG. 5G, FIG. 5H, and FIG. 5I show an implementation example in accordance with one or more embodiments of the invention.

Figure 5A:
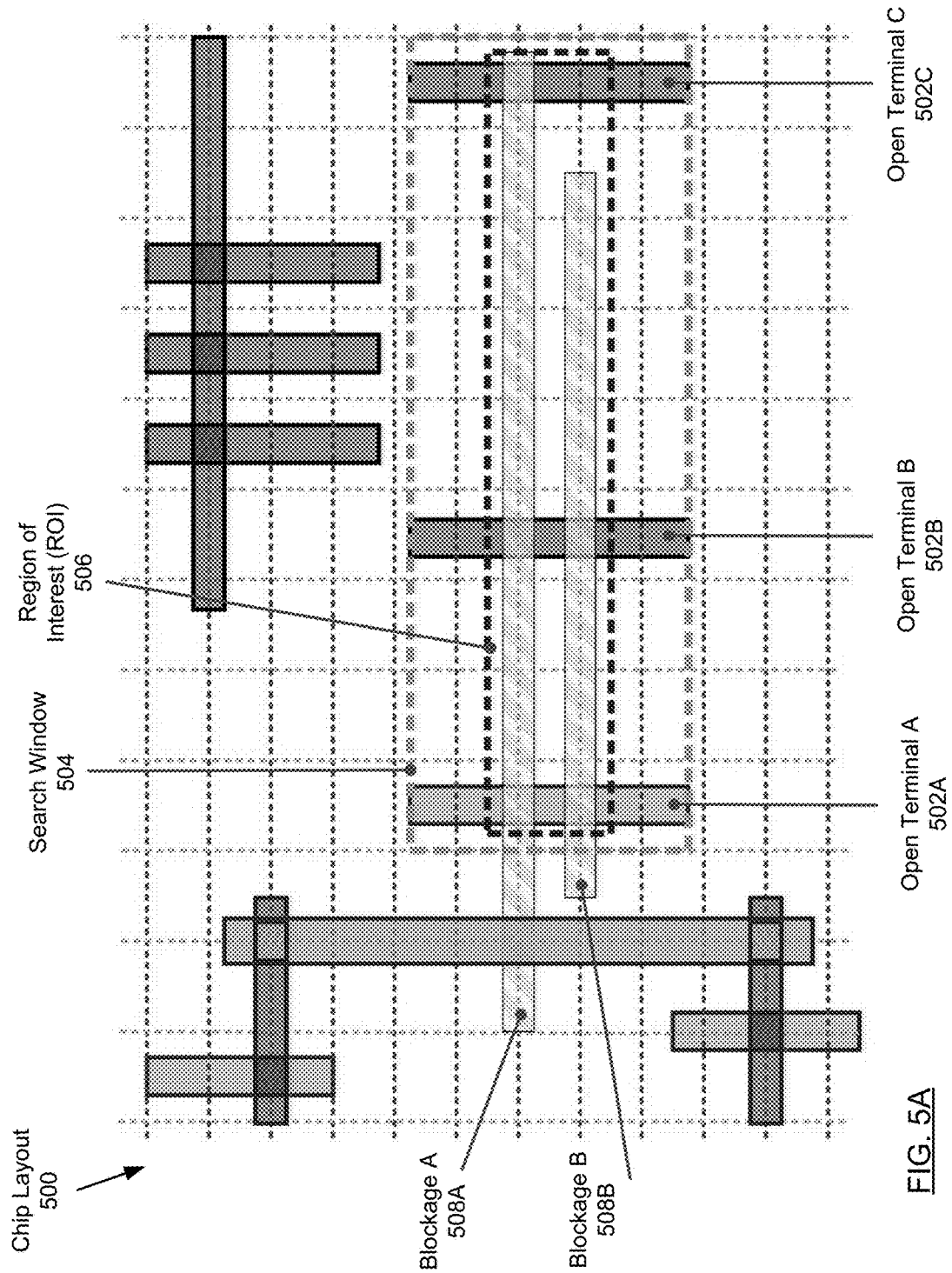
FIG. 5A, FIG. 5B, FIG. 5C, and FIG. 5D show examples in accordance with one or more embodiments of the invention.

FIG. 5A illustrates a subset of open terminals (502A, 502B, 502C) in a search window (504) of the chip layout (500). The route enhancer (104) also calculates a region of interest (ROI) (506) for the open terminals (502A, 502B, 502C). Open terminal A (502A) belongs to a first net, net1. Open terminal B (502B) and open terminal C (502C) belong to a second net, net2. The ROI (506) contains the M1 tracks that are able to connect the open terminals (502A, 502B, 502C) while satisfying the applicable design rule constraints. In FIG. 5A, all the M1 tracks in the ROI (506) are occupied with blockages (508A, 508B), in this case, M1 routes connecting terminals of other nets. The blockages (508A, 508B) prevent routing the open terminals (502A, 502B, 502C) using the tracks in the ROI (506).

Figure 5B:
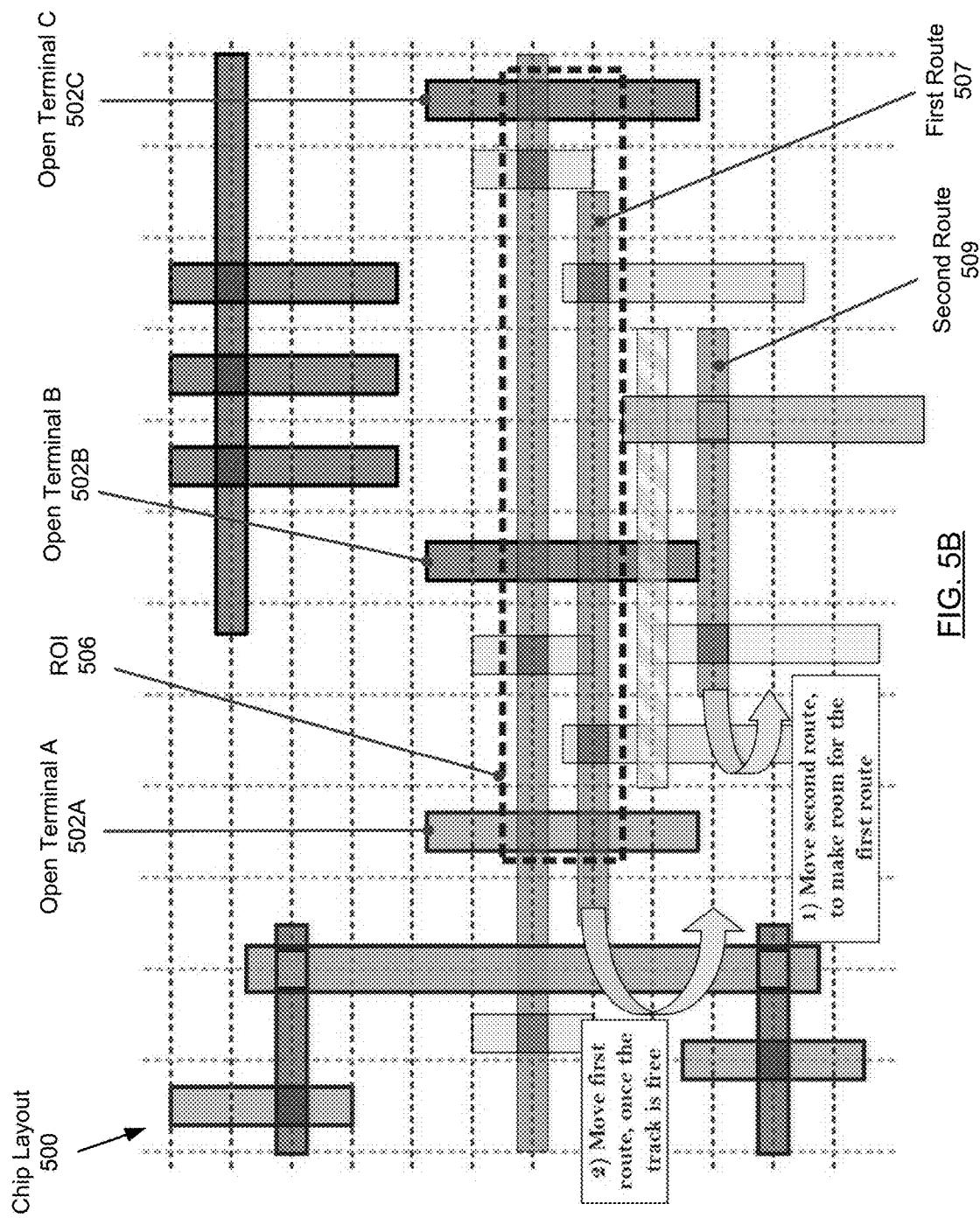

The route enhancer (104) determines that no track in the M1 layer within the ROI (506) can be used to connect the open terminals (502A, 502B, 502C). The route enhancer (104) attempts a rip-up and reroute with lookahead strategy to connect the open terminals (502A, 502B, 502C) to the M1 layer within the ROI (506). The route enhancer (104) "looks ahead" and determines that a first track can be used to connect the open terminals (502A, 502B, 502C) after moving (i.e., "ripping up and rerouting") a first route from the first track to a second track within the chip layout (500), without violating the design rule constraints. As shown in FIG. 5B, the first route (507) blocks the first track, preventing the first track from being used to connect the open terminals (502A, 502B, 502C). The route enhancer (104) looks further ahead and determines that the second track is in turn blocked by a second route (509) which must be moved to a third track in order for the second track to be able to accommodate the first route.

Figure 5C:
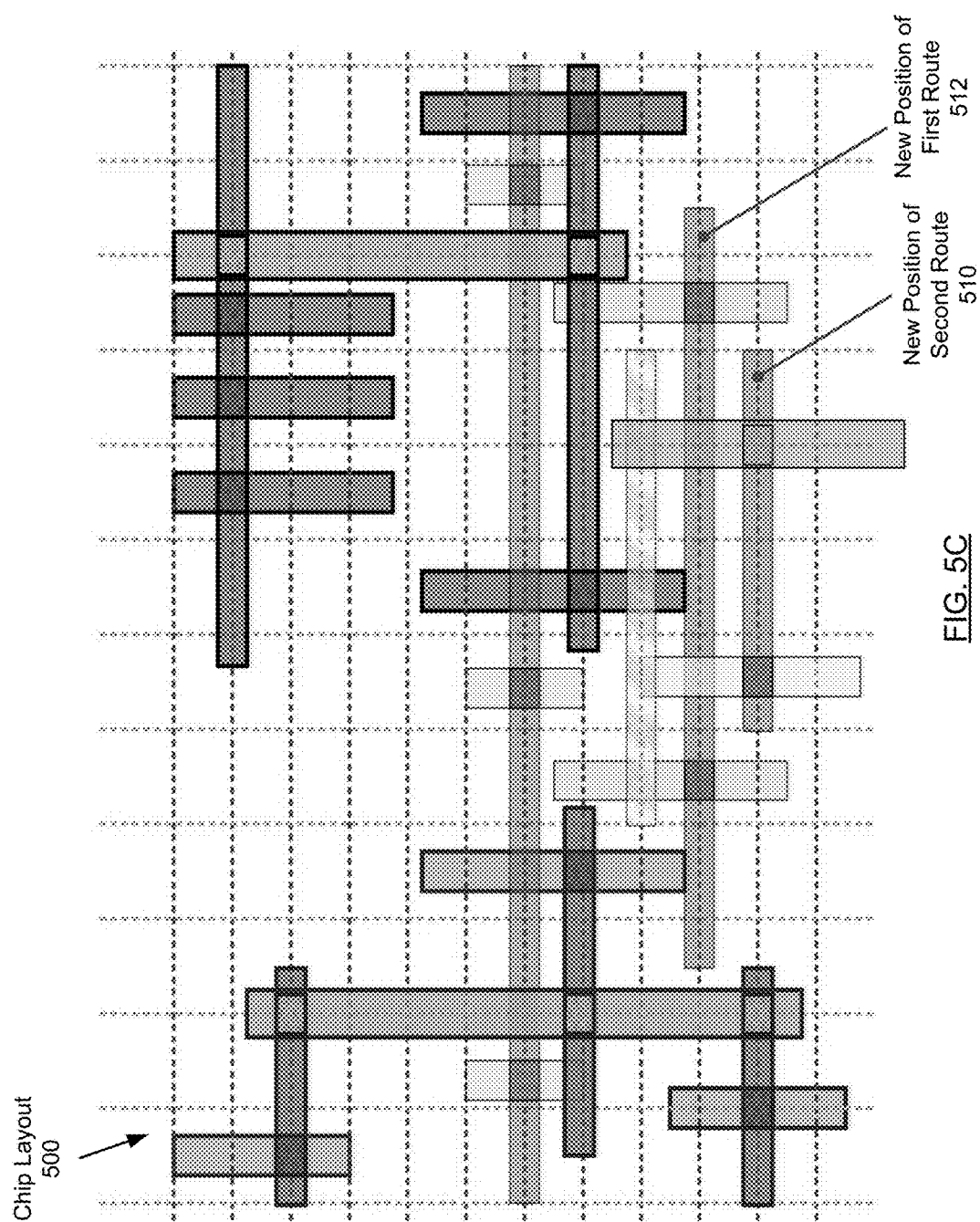

FIG. 5C shows the chip layout (500) after the route enhancer (104) performs rip-up and reroute to resolve the open terminals (502A, 502B, 502C) of net1 and net2. FIG. 5C illustrates the new position of second route (510). Once the second route has been moved, thereby unblocking the second track, the route enhancer (104) next moves the first route from the first track to the second track. FIG. 5C also illustrates the new position of the first route (512).

FIG. 5B and FIG. 5C illustrate the capability of the route enhancer (104) to look several moves ahead to resolve open terminals. FIG. 5B and FIG. 5C also illustrate an intelligent grouping of open terminals into subsets such that open terminals of more than one net can be resolved using a single solution (e.g., sequence of moves).

If moving the second route results in additional open terminals, then the move is reverted (i.e., undone), and moving the second route to a different destination track is attempted (e.g., a fourth track is used as the destination of the second route, instead of the third track). Similarly, if moving the first route results in additional open terminal, then the move is reverted (i.e., undone), and moving the first route to a different destination track is attempted (e.g., a fifth track is used as the destination of the first route, instead of the second track).

Finally, the route enhancer (104) connects the open terminals (502A, 502B, 502C) to contacts of the now-available first track.

In an alternate scenario, the rip-up and reroute with lookahead strategy fails to connect the open terminals (502A, 502B, 502C) to the M1 layer of the chip layout (500). This failure may be due to several reasons. For example, the route enhancer (104) may have been unable to connect open terminals (502A, 502B, 502C) using contacts of any track in the M1 layer within the ROI (506) due to being unable to unblock the track without generating new open terminals.

Figure 5D:
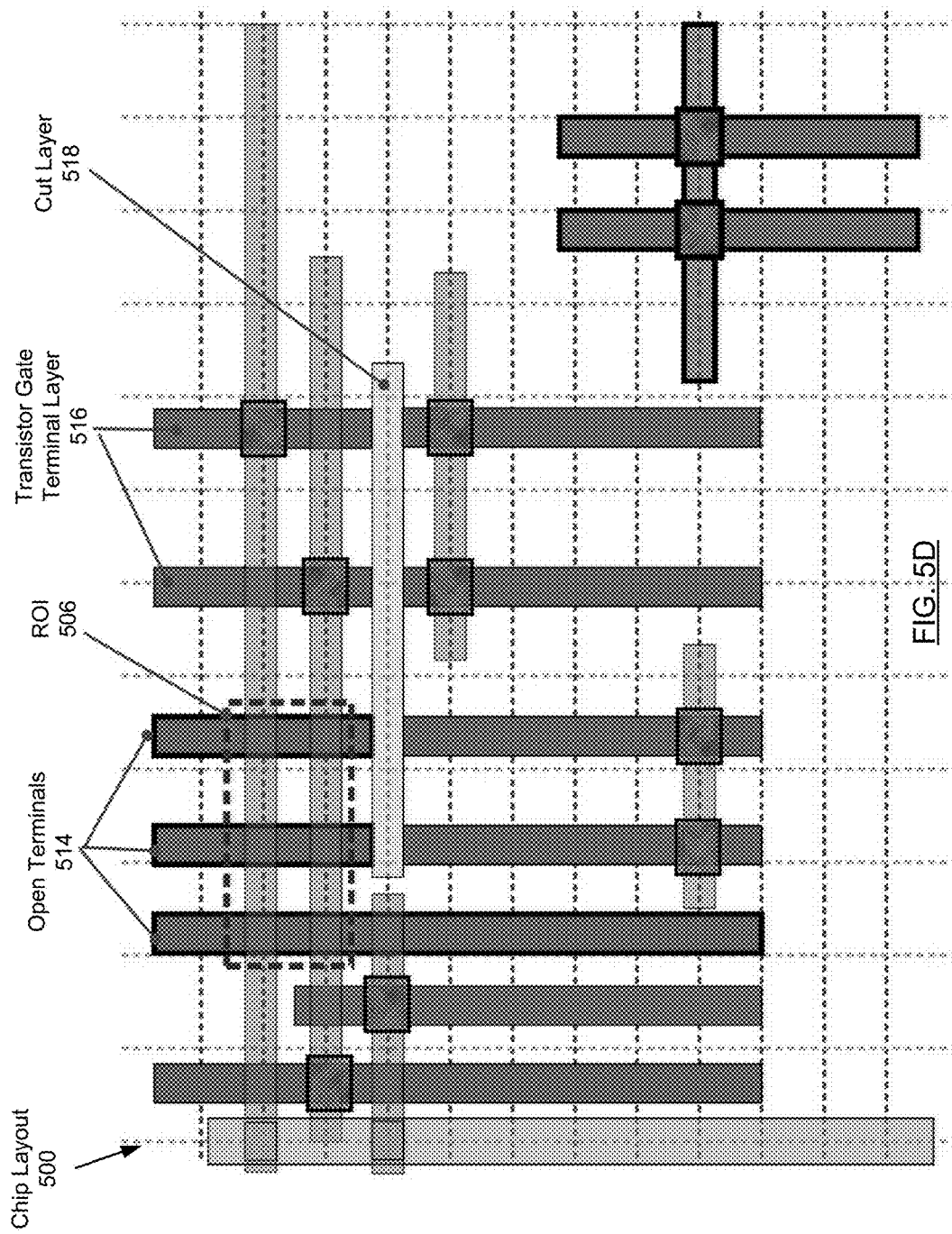

FIG. 5D illustrates this alternate scenario in which the route enhancer (104) attempts an expanding ROI strategy based on moving a layer to a new location within the chip layout (500). In FIG. 5D, there are three open terminals (514) of a net (net1). FIG. 5D also shows a cut layer (518) used for segmenting the net connectivity of the shapes on the transistor gate terminal layer (516).

Figure 5E:
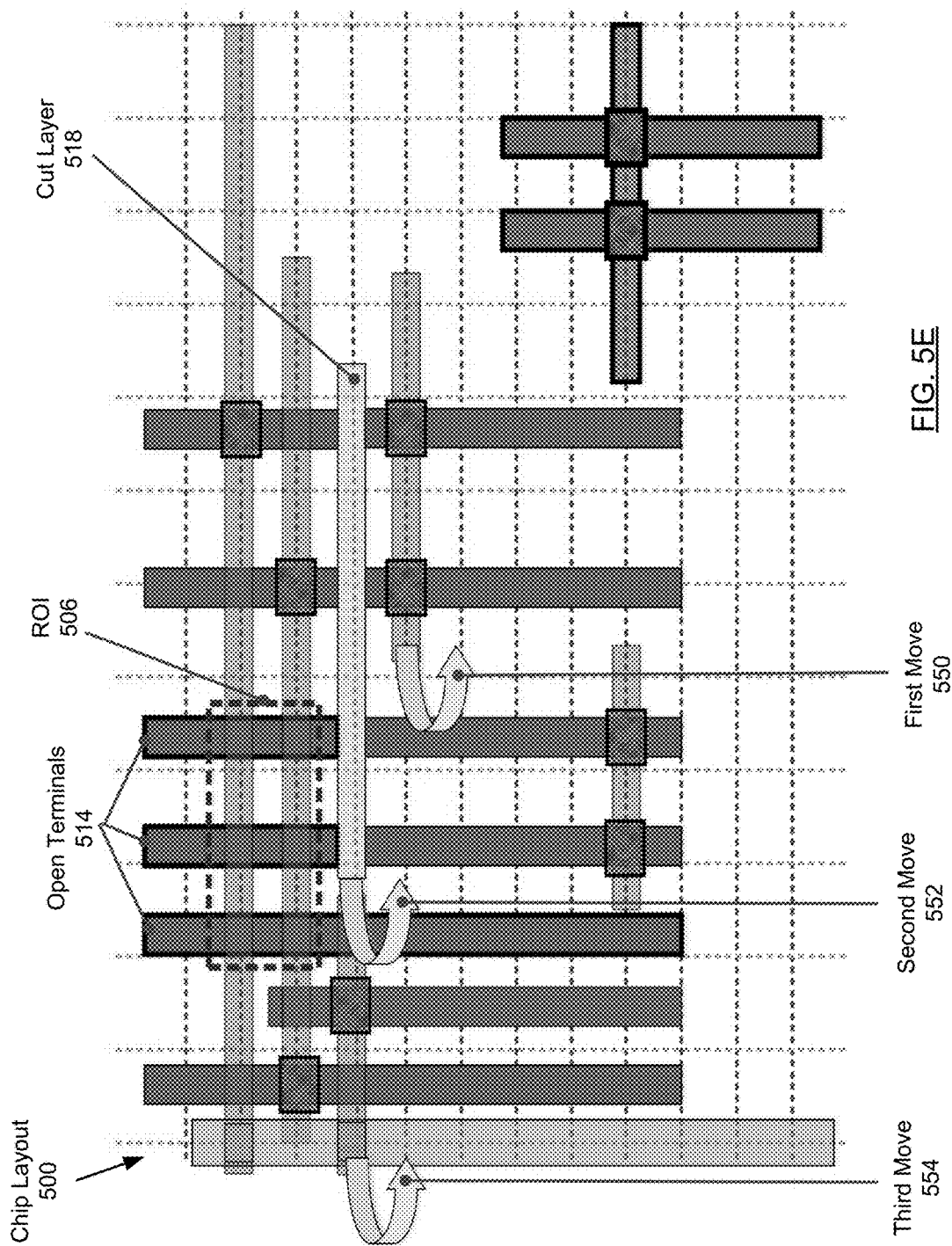
FIG. 5E, FIG. 5F, FIG. 5G, FIG. 5H and FIG. 5I show examples in accordance with one or more embodiments of the invention.
Figure 5F:
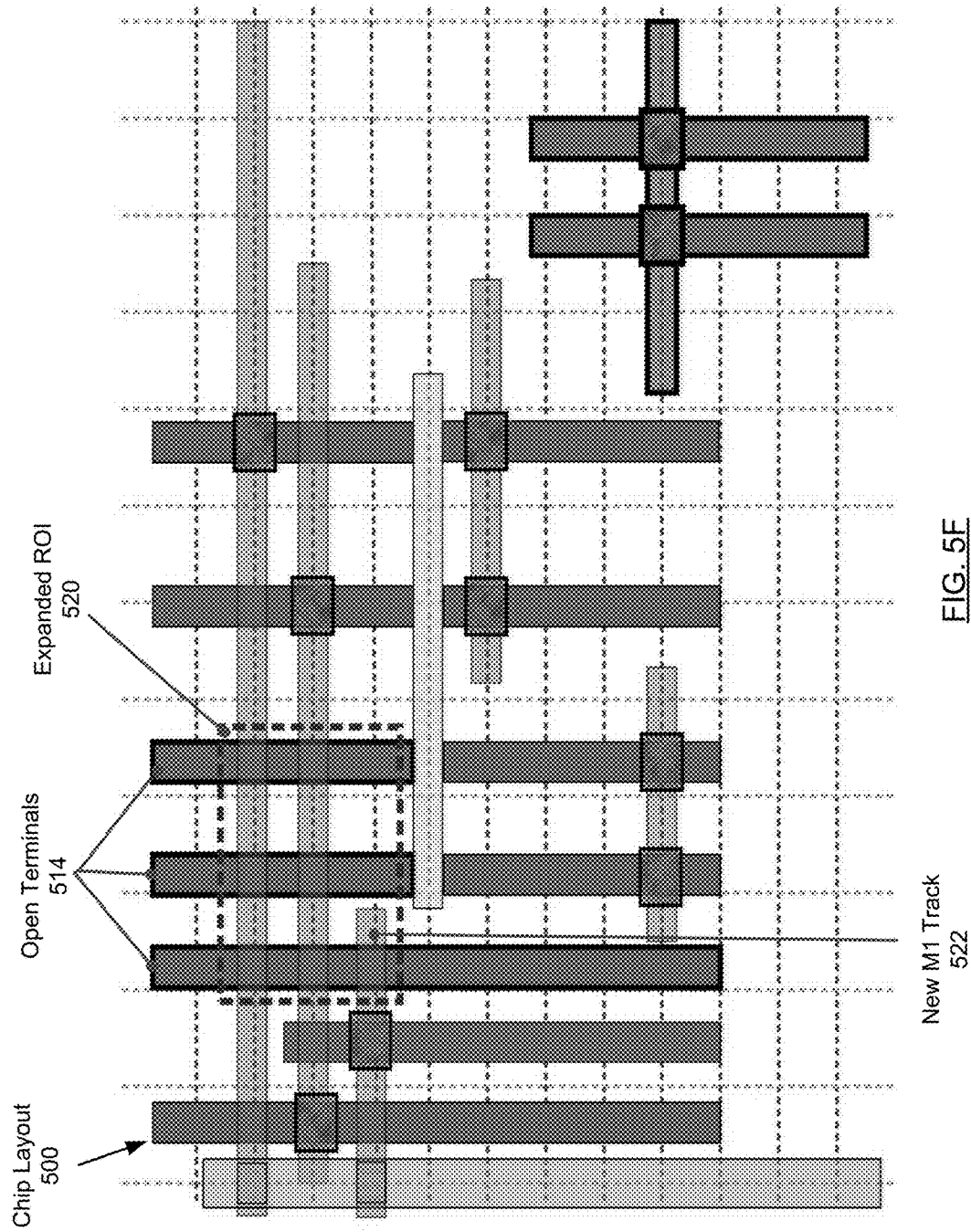
Figure 5G:
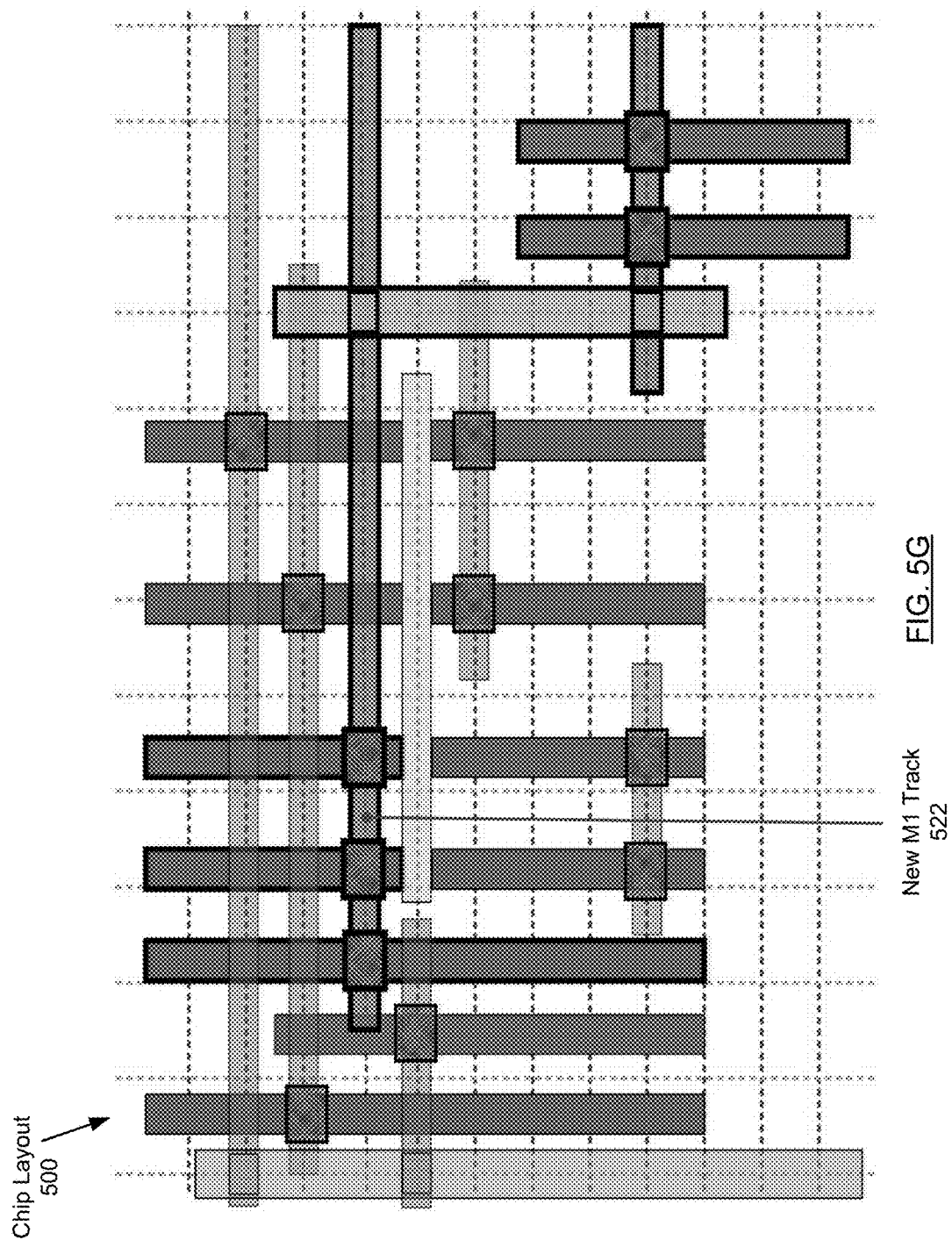

FIG. 5E illustrates a sequence of moves calculated by the route enhancer (104) to resolve the open terminals (514) of net1. The route enhancer (104) determines that moving the cut layer (518) of the chip layout (500) causes the ROI (506) for the open terminals (514) to expand. The route enhancer (104) attempts to move the cut layer (518) in order to expand the ROI (506), so that a new track entering the expanded ROI can be used to connect the open terminals (514). However, the new position (track) for the cut layer (518) is occupied by an existing M1 route. Therefore, the first move (550) by the route enhancer (104) is to move the occupying M1 route, via a rip-up and reroute with lookahead strategy, so that the route enhancer (104) can then apply the second move (552): moving the cut layer (518) to the new position. The route enhancer then calculates an expanded ROI (520), as illustrated in FIG. 5F. The route enhancer (104) then determines that a new track in the M1 layer (522) has entered the expanded ROI (520). However, the route enhancer (104) further determines that the new track will be usable only after a third move (554) (see FIG. 5E) to relocate another M1 route occupying the new M1 track (522). Therefore, the route enhancer (104) applies a rip-up and reroute with lookahead strategy to move the blocking route. FIG. 5G shows the chip layout (500) after the blocking route is moved. The route enhancer (104) then connects all the open terminals (514) using contacts of the new M1 track (522).

In yet another alternate scenario, the expanding ROI strategy fails to connect all the open terminals to the M1 layer of the chip layout (500). This failure may be due to several reasons. For example, the route enhancer (104) may have been unable to increase the size of the ROI. Another reason is that the route enhancer (104) may have been unable to connect all open terminals using any new track in the M1 layer within the expanded ROI (520) due to being unable to unblock the track without generating new open terminals.

Figure 5H:
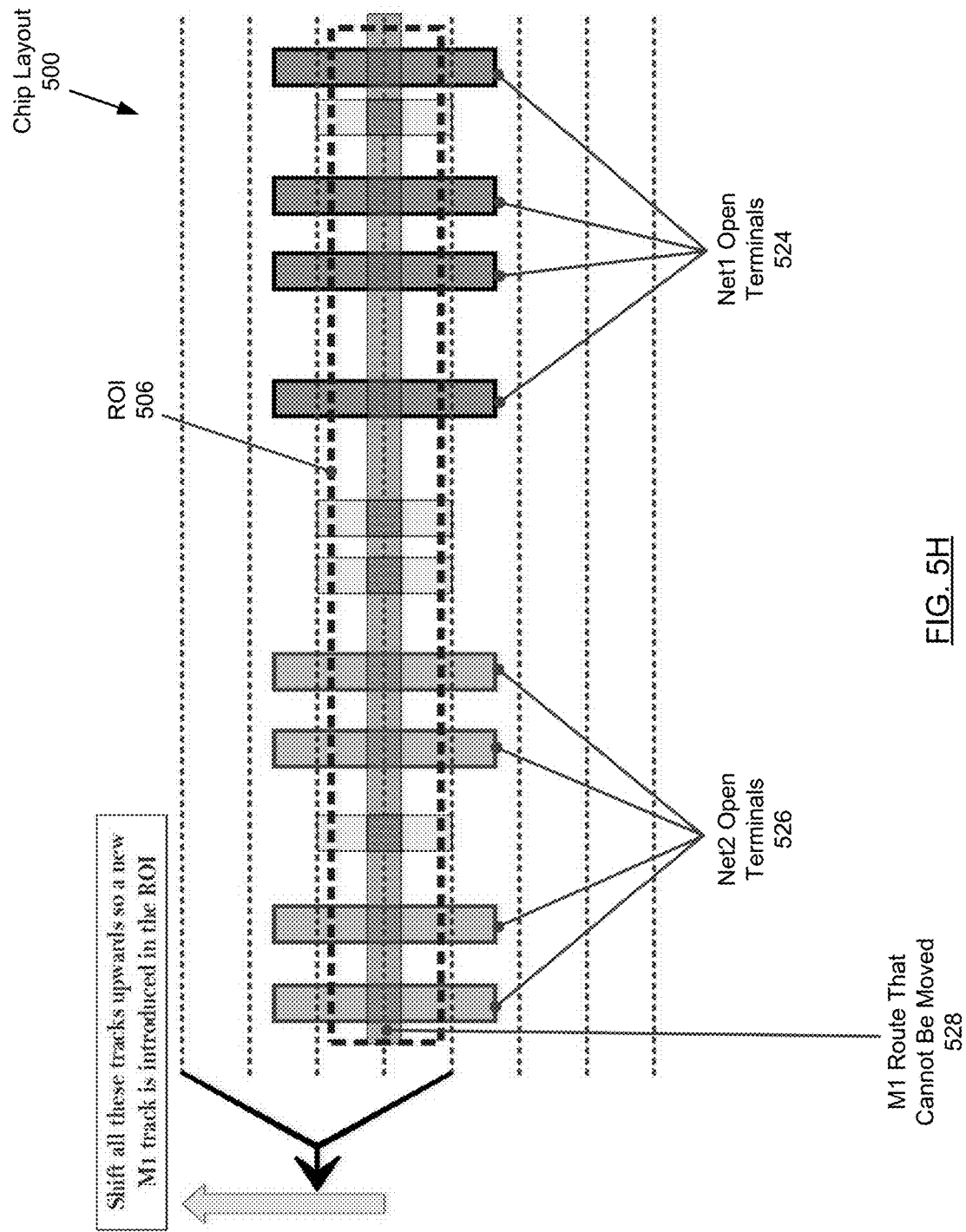

In this alternate scenario, after the failure of the expanding ROI strategy, the route enhancer (104) then attempts a track shifting strategy based on shifting the locations of one or more tracks within the chip layout (500) in order to introduce a new track into the ROI, while satisfying the applicable design rule constraints. FIG. 5H illustrates a chip layout (500) with net1 open terminals (524) and net2 open terminals (526). FIG. 5H also illustrates a track in the ROI (506) that is occupied by an M1 route that cannot be moved (528). The route enhancer (104) determines that shifting the locations of one or more tracks upward within the chip layout (500) causes a shifted track to enter the ROI (506).

Figure 5I:
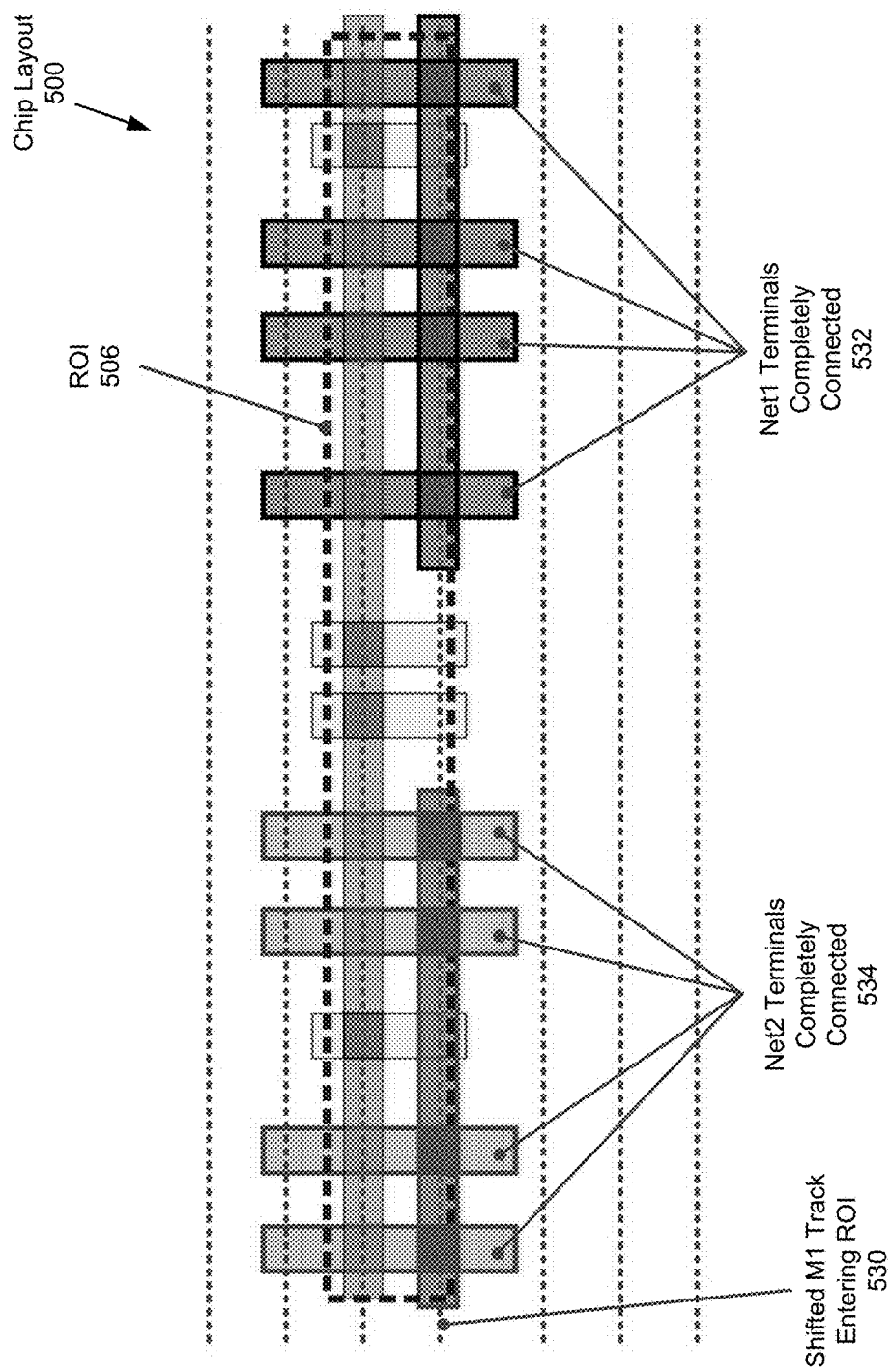

FIG. 5I illustrates the chip layout (500) after applying the track shifting strategy. FIG. 5I shows that a shifted M1 track (530) introduced into the ROI (506) can be used to completely connect the net1 terminals (532) and completely connect the net2 terminals (534) simultaneously.

Figure 6A:
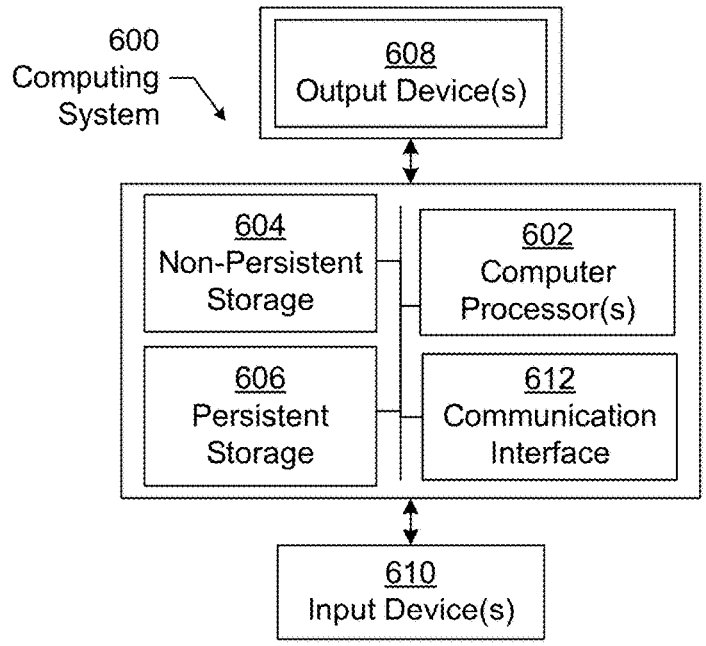
FIG. 6A and FIG. 6B show computing systems in accordance with one or more embodiments of the invention.

Embodiments disclosed herein may be implemented on a computing system. Any combination of mobile, desktop, server, router, switch, embedded device, or other types of hardware may be used. For example, as shown in FIG. 6A, the computing system (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), and numerous other elements and functionalities.

The computer processor(s) (602) may be an integrated circuit for processing instructions. For example, the computer processor(s) may be one or more cores or micro-cores of a processor. The computing system (600) may also include one or more input devices (610), such as a touchscreen, keyboard, mouse, microphone, touchpad, electronic pen, or any other type of input device.

The communication interface (612) may include an integrated circuit for connecting the computing system (600) to a network (not shown) (e.g., a local area network (LAN), a wide area network (WAN) such as the Internet, mobile network, or any other type of network) and/or to another device, such as another computing device.

Further, the computing system (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing systems exist, and the aforementioned input and output device(s) may take other forms.

Software instructions in the form of computer readable program code to perform embodiments disclosed herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments disclosed herein.

Figure 6B:
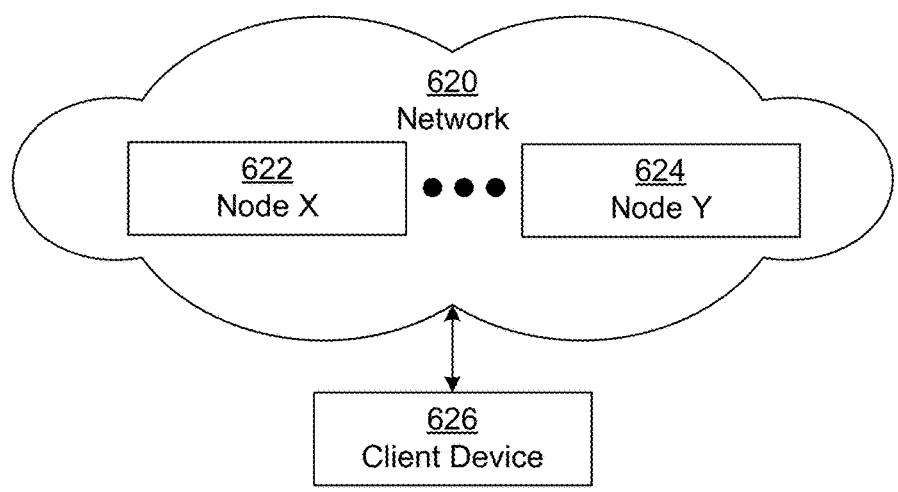

The computing system (600) in FIG. 6A may be connected to or be a part of a network. For example, as shown in FIG. 6B, the network (620) may include multiple nodes (e.g., node X (622), node Y (624)). Each node may correspond to a computing system, such as the computing system shown in FIG. 6A, or a group of nodes combined may correspond to the computing system shown in FIG. 6A. By way of an example, embodiments disclosed herein may be implemented on a node of a distributed system that is connected to other nodes. By way of another example, embodiments disclosed herein may be implemented on a distributed computing system having multiple nodes, where each portion disclosed herein may be located on a different node within the distributed computing system. Further, one or more elements of the aforementioned computing system (600) may be located at a remote location and connected to the other elements over a network.

Although not shown in FIG. 6B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (622), node Y (624)) in the network (620) may be configured to provide services for a client device (626). For example, the nodes may be part of a cloud computing system. The nodes may include functionality to receive requests from the client device (626) and transmit responses to the client device (626). The client device (626) may be a computing system, such as the computing system shown in FIG. 6A. Further, the client device (626) may include and/or perform all or a portion of one or more embodiments disclosed herein.

The computing system or group of computing systems described in FIGS. 6A and 6B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file.

The computing system in FIG. 6A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions present only a few examples of functions performed by the computing system of FIG. 6A and the nodes and/or client device in FIG. 6B. Other functions may be performed using one or more embodiments disclosed herein.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:
1. A method for enhancing a chip layout, comprising:
  obtaining the chip layout comprising:
    a first layer comprising a first track and a second track,
    a first route occupying the first track, and
    an open net comprising open terminals;
  grouping the open terminals into at least a first subset of open terminals;
  calculating, based on the first subset, a region of interest (ROI) within the chip layout;
  determining that neither the first track nor the second track within the ROI can be used to connect all the open terminals in the first subset;

determining that the first track can be used to connect all the open terminals in the first subset after moving the first route from the first track to the second track;
moving, within the chip layout, the first route from the first track to the second track; and
attempting to connect all the open terminals in the first subset using the first track.

2. The method of claim 1, further comprising:
determining, prior to moving the first route, that the second track is occupied by a second route; and
moving, within the chip layout, the second route to a third track of the first layer.

3. The method of claim 1, wherein the chip layout further comprises a second layer comprising a third track, the method further comprising:
determining that the third track within the ROI can be used to connect all the open terminals in the first subset; and
connecting all the open terminals in the first subset using the third track.

4. The method of claim 1, further comprising:
calculating a revised ROI after moving, within the chip layout, a second layer of the chip layout;
determining that a third track of the first layer in the revised ROI can be used to connect all the open terminals in the first subset; and
connecting all the open terminals in the first subset using the third track.

5. The method of claim 1, further comprising:
determining that shifting a set of tracks within the chip layout causes a third track of the first layer to enter the ROI;
determining that the third track can be used to connect all the open terminals in the first subset;
shifting, within the chip layout, the set of tracks; and
connecting all the open terminals in the first subset using the third track.

6. The method of claim 1, further comprising:
failing to connect all the open terminals in the first subset using the first track;
calculating a revised ROI after moving, within the chip layout, a second layer of the chip layout;
determining that no track of the first layer in the revised ROI can be used to connect all the open terminals in the first subset;
determining that shifting a set of tracks within the chip layout causes a third track of the first layer to enter the revised ROI;
determining that the third track can be used to connect all the open terminals in the first subset;
shifting, within the chip layout, the set of tracks; and
connecting all the open terminals in the first subset using the third track.

7. The method of claim 1, further comprising:
removing an open terminal from the first subset;
calculating, based on the first subset after removing the open terminal, a revised ROI within the chip layout;
determining that a third track of the first layer in the revised ROI can be used to connect all the open terminals in the first subset; and
connecting all the open terminals in the first subset using the third track.

8. The method of claim 1, wherein moving the first route does not generate a new open terminal within the chip layout.

9. A system for enhancing a chip layout, comprising:
a processor;
a memory comprising instructions that, when executed by the processor, cause the processor to:
obtain the chip layout comprising:
a first layer comprising a first track and a second track,
a first route occupying the first track, and
an open net comprising open terminals;
group the open terminals into at least a first subset of open terminals;
calculate, based on the first subset, a region of interest (ROI) within the chip layout;
determine that neither the first track nor the second track within the ROI can be used to connect all the open terminals in the first subset;
determine that the first track can be used to connect all the open terminals in the first subset after moving the first route from the first track to the second track;
move, within the chip layout, the first route from the first track to the second track; and
attempt to connect all the open terminals in the first subset using the first track; and
a repository comprising the chip layout.

10. The system of claim 9, wherein the memory further comprises instructions that, when executed by the processor, cause the processor to:
determine, prior to moving the first route, that the second track is occupied by a second route; and
move, within the chip layout, the second route to a third track of the first layer.

11. The system of claim 9, wherein the chip layout further comprises a second layer comprising a third track, wherein the memory further comprises instructions that, when executed by the processor, cause the processor to:
determine that the third track within the ROI can be used to connect all the open terminals in the first subset; and
connect all the open terminals in the first subset using the third track.

12. The system of claim 9, wherein the memory further comprises instructions that, when executed by the processor, cause the processor to:
calculate a revised ROI after moving, within the chip layout, a second layer of the chip layout;
determine that a third track in the revised ROI can be used to connect all the open terminals of the first subset; and
connect all the open terminals of the first subset using the third track.

13. The system of claim 9, wherein the memory further comprises instructions that, when executed by the processor, cause the processor to:
determine that shifting a set of tracks within the chip layout causes a third track of the first layer to enter the ROI;
determine that the third track can be used to connect all the open terminals in the first subset;
shift, within the chip layout, the set of tracks; and
connect all the open terminals in the first subset using the third track.

14. The system of claim 9, wherein the memory further comprises instructions that, when executed by the processor, cause the processor to:
fail to connect all the open terminals in the first subset using the first track;
calculate a revised ROI after moving, within the chip layout, a second layer of the chip layout;
determine that no track of the first layer in the revised ROI can be used to connect all the open terminals in the first subset;

determine that shifting a set of tracks within the chip layout causes a third track of the first layer to enter the revised ROI;

determine that the third track can be used to connect all the open terminals in the first subset;

shift, within the chip layout, the set of tracks; and connect all the open terminals in the first subset using the first track.

15. The system of claim 9, wherein the memory further comprises instructions that, when executed by the processor, cause the processor to:

remove an open terminal from the first subset;

calculate, based on the first subset after removing the open terminal, a revised ROI within the chip layout;

determine that a third track of the first layer in the revised ROI can be used to connect all the open terminals in the first subset; and connect all the open terminals in the first subset using the third track.

16. A non-transitory computer readable medium comprising instructions that, when executed by a processor, perform a method for enhancing a chip layout, the method comprising:

obtaining the chip layout comprising:
a first layer comprising a first track and a second track,
a first route occupying the first track, and
an open net comprising open terminals;

grouping the open terminals into at least a first subset of open terminals;

calculating, based on the first subset, a region of interest (ROI) within the chip layout;

determining that neither the first track nor the second track within the ROI can be used to connect all the open terminals in the first subset;

determining that the first track can be used to connect all the open terminals in the first subset after moving the first route from the first track to the second track;

moving, within the chip layout, the first route from the first track to the second track; and attempting to connect all the open terminals in the first subset using the first track.

17. The non-transitory computer readable medium of claim 16, wherein the method further comprises:

determining, prior to moving the first route, that the second track is occupied by a second route; and moving, within the chip layout, the second route to a third track of the first layer.

18. The non-transitory computer readable medium of claim 16, wherein the method further comprises:

calculating a revised ROI after moving, within the chip layout, a second layer of the chip layout;

determining that a third track of the first layer in the revised ROI can be used to connect all the open terminals in the first subset; and connecting all the open terminals in the first subset using the third track.

19. The non-transitory computer readable medium of claim 16, wherein the method further comprises:

determining that shifting a set of tracks within the chip layout causes a third track of the first layer to enter the ROI;

determining that the third track can be used to connect all the open terminals in the first subset;

shifting, within the chip layout, the set of tracks; and connecting all the open terminals in the first subset using the third track.

20. The non-transitory computer readable medium of claim 16, wherein the method further comprises:

failing to connect all the open terminals in the first subset using the first track;

calculating a revised ROI after moving, within the chip layout, a second layer of the chip layout;

determining that no track of the first layer in the revised ROI can be used to connect all the open terminals in the first subset;

determining that shifting a set of tracks within the chip layout causes a third track of the first layer to enter the revised ROI;

determining that the third track can be used to connect all the open terminals in the first subset;

shifting, within the chip layout, the set of tracks; and connecting all the open terminals in the first subset using the first track.

* * * * *

UNITED STATES PATENT AND TRADEMARK OFFICE
CERTIFICATE OF CORRECTION

PATENT NO. : 10,339,252 B2  
APPLICATION NO. : 15/693396  
DATED : July 2, 2019  
INVENTOR(S) : Singh et al.

Page 1 of 1

It is certified that error appears in the above-identified patent and that said Letters Patent is hereby corrected as shown below:

In the Specification

In Column 3, Line 2, delete "that that" and insert -- that --, therefor.

Signed and Sealed this  
Twenty-eighth Day of July, 2020

Andrei Iancu  
*Director of the United States Patent and Trademark Office*